US012079134B2

(12) United States Patent
Bhushan et al.

(10) Patent No.: US 12,079,134 B2
(45) Date of Patent: Sep. 3, 2024

(54) EFFICIENT CACHE PROGRAM OPERATION WITH DATA ENCODING

(71) Applicant: Micron Technology, Inc., Boise, ID (US)

(72) Inventors: Sushanth Bhushan, Boise, ID (US); Dheeraj Srinivasan, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/178,105

(22) Filed: Mar. 3, 2023

(65) Prior Publication Data

US 2023/0325323 A1 Oct. 12, 2023

Related U.S. Application Data

(60) Provisional application No. 63/329,102, filed on Apr. 8, 2022.

(51) Int. Cl.
*G06F 12/08* (2016.01)
*G06F 12/0891* (2016.01)

(52) U.S. Cl.
CPC ................................ *G06F 12/0891* (2013.01)

(58) Field of Classification Search
CPC ............................................ G06F 12/02–0897
See application file for complete search history.

(56) References Cited

U.S. PATENT DOCUMENTS 7,685,354 B1 * 3/2010 Hetherington ...... G06F 12/0846 711/3
2014/0040637 A1 * 2/2014 Hameed .............. G06F 12/0868 713/193

* cited by examiner

*Primary Examiner* — Khoa D Doan
(74) *Attorney, Agent, or Firm* — LOWENSTEIN SANDLER LLP

(57) ABSTRACT

Control logic in a memory device executes a first programming operation to program the set of memory cells to a set of programming levels. A first cache ready signal is generated, the first cache ready signal indicating to a host system to send first data associated with a second programming operation to an input/output (I/O) data cache of the memory device. A first encoded data value and a second encoded data value associated with each memory cell of the set of memory cells are generated. A second cache ready signal is generated, the second cache ready signal indicating to the host system to send second data associated with the next programming operation to the I/O data cache. The first data associated with the second programming operation is caused to be stored in a third data cache of the cache storage. A third cache ready signal is generated, the third cache ready signal indicating to the host system to send third data associated with the second programming operation to the I/O data cache.

20 Claims, 14 Drawing Sheets

|  $350_0$ | $350_1$ | $350_2$ | $350_3$ |
|---|---|---|---|
| Block$_0$ 250$_0$ | Block$_0$ 250$_0$ | Block$_0$ 250$_0$ | Block$_0$ 250$_0$ |
| Block$_1$ 250$_1$ | Block$_1$ 250$_1$ | Block$_1$ 250$_1$ | Block$_1$ 250$_1$ |
| Block$_2$ 250$_2$ | Block$_2$ 250$_2$ | Block$_2$ 250$_2$ | Block$_2$ 250$_2$ |
| Block$_3$ 250$_3$ | Block$_3$ 250$_3$ | Block$_3$ 250$_3$ | Block$_3$ 250$_3$ |
| Block$_4$ 250$_4$ | Block$_4$ 250$_4$ | Block$_4$ 250$_4$ | Block$_4$ 250$_4$ |
| ⋮ | ⋮ | ⋮ | ⋮ |
| Block$_{L-4}$ 250$_{L-4}$ | Block$_{L-4}$ 250$_{L-4}$ | Block$_{L-4}$ 250$_{L-4}$ | Block$_{L-4}$ 250$_{L-4}$ |
| Block$_{L-3}$ 250$_{L-3}$ | Block$_{L-3}$ 250$_{L-3}$ | Block$_{L-3}$ 250$_{L-3}$ | Block$_{L-3}$ 250$_{L-3}$ |
| Block$_{L-2}$ 250$_{L-2}$ | Block$_{L-2}$ 250$_{L-2}$ | Block$_{L-2}$ 250$_{L-2}$ | Block$_{L-2}$ 250$_{L-2}$ |
| Block$_{L-1}$ 250$_{L-1}$ | Block$_{L-1}$ 250$_{L-1}$ | Block$_{L-1}$ 250$_{L-1}$ | Block$_{L-1}$ 250$_{L-1}$ |
| Block$_L$ 250$_L$ | Block$_L$ 250$_L$ | Block$_L$ 250$_L$ | Block$_L$ 250$_L$ |
| 240$_0$ | 240$_1$ | 240$_2$ | 240$_3$ |

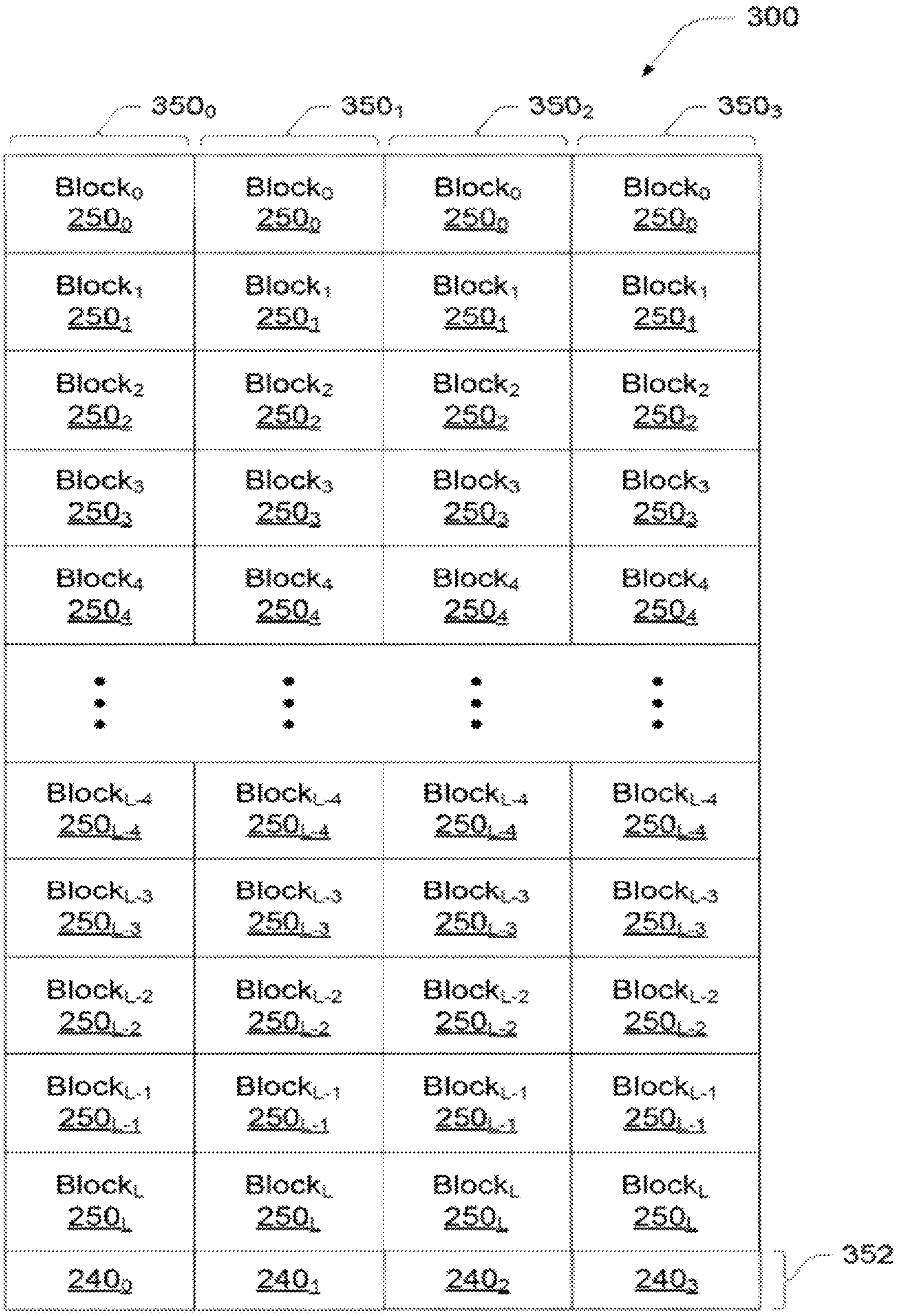

| | ENCODED DATA VALUE B PDC1 | ENCODED DATA VALUE A PDC0 |
|---|---|---|
| MEMORY CELLS TO BE PROGRAMMED TO LEVEL 6 | 0 | 0 |
| MEMORY CELLS TO BE PROGRAMMED TO LEVEL 7 | 0 | 1 |
| MEMORY CELLS TO BE PROGRAMMED TO LEVEL 6 SSPC | 1 | 0 |
| PROGRAMMED MEMORY CELLS TO BE INHIBITED | 1 | 1 |
| LEVEL 7 SSPC CELLS | DROPPED | DROPPED |

FIG. 7

| | ENCODED DATA VALUE B PDC1 | ENCODED DATA VALUE A PDC0 | IDENTIFIED STATE OF THE MEMORY CELL |
|---|---|---|---|
| MEMORY CELL 1 | 0 | 1 | MEMORY CELL 1 TO BE PROGRAMMED TO LEVEL 7 |
| MEMORY CELL 2 | 1 | 1 | MEMORY CELL 2 IS PROGRAMMED AND IS TO BE INHIBITED |
| MEMORY CELL 3 | 0 | 0 | MEMORY CELL 3 TO BE PROGRAMMED TO LEVEL 6 |
| ... | ... | ... | ... |
| MEMORY CELL X | 0 | 1 | 1MEMORY CELL N TO BE PROGRAMMED TO LEVEL 7 |

FIG. 8

| | PDC0 | PDC1 | PDC2 | I/O DATA CACHE (SDC) | SA CACHE |
|---|---|---|---|---|---|
| AFTER L4 PASS | UP+INH | XP+INH | SSPC+INH | LP(N+1) | INH/TARGET |
| AFTER L5 PASS | ENCODED DATA A | ENCODED DATA B | FREE/AVAILABLE | LP(N+1) | INH/TARGET |
| DURING L6 PROGRAMMING | ENCODED DATA A | ENCODED DATA B | LP(N+1) | UP(N+1) | INH/TARGET |
| AFTER L6 PASS | FREE/AVAILABLE | FREE/AVAILABLE | LP(N+1) | UP(N+1) | INHIBIT |
| DURING L7 PROGRAMMING | UP(N+1) | LP(N+1) | - | XP(N+1) | INHIBIT |

EFFICIENT CACHE PROGRAM OPERATION WITH DATA ENCODING

CROSS-REFERENCE TO RELATED APPLICATION

This application claims the benefit of U.S. Provisional Application No. 63/329,102, titled "Efficient Cache Program Operation with Data Cache Encoding," filed Apr. 8, 2022, the entire disclosure of which is incorporated herein by reference.

TECHNICAL FIELD

Embodiments of the disclosure relate generally to memory sub-systems, and more specifically, relate to an efficient cache program operation with data encoding to enable early cache release.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 is a block schematic of a portion of an array of memory cells as could be used in a memory of the type described with reference to FIG. 1B according to an embodiment.

FIG. 6 illustrates an example data structure including the encoded data generated by a program manager during execution of a cache program operation, according to one or more embodiments of the present disclosure.

FIG. 7 illustrates an example data structure including encoded data value combinations for each memory cell of a set of memory cells and a corresponding state of each memory cell determined based on the encoded data value combination, according to one or more embodiments of the present disclosure.

FIG. 8 illustrates an example of the various states of cache storage, an input/output data cache, and a sense amplifier cache at different times during execution of a cache program operation with early cache release sub-operations, according to one or more embodiments of the present disclosure.

DETAILED DESCRIPTION

Figure 1A:
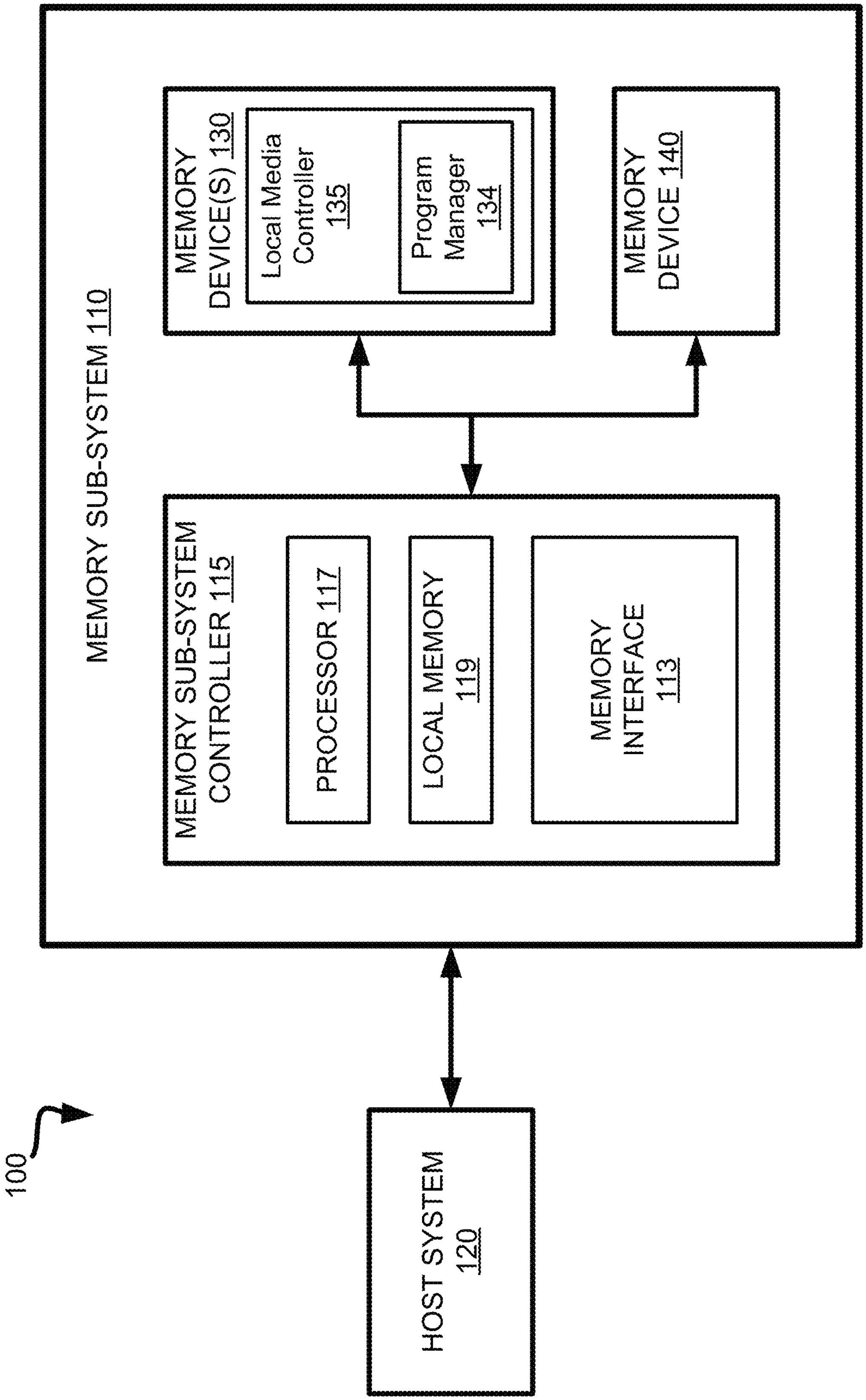
FIG. 1A illustrates an example computing system that includes a memory sub-system in accordance with one or more embodiments of the present disclosure.

Aspects of the present disclosure are directed to programming of a memory device in a memory sub-system using a multiple plane programming operation including terminating programming of one or more quick planes and boosting one or more lagging memory planes. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1A. A non-volatile memory device is a package of one or more memory dies. Each memory die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Memory cells are formed onto a silicon wafer in an array of columns connected by conductive lines (also referred to as bitlines) and rows connected by conductive lines (also referred to as wordlines). A wordline can refer to a conductive line that connects control gates of a set (e.g., a row) of memory cells of a memory device that are used with one or more bitlines to generate the address of each of the memory cells. The intersection of a bitline and wordline constitutes the address of the memory cell.

A block hereinafter refers to a unit of the memory device used to store data and can include a group of memory cells, a wordline group, a wordline, or individual memory cells. Each block can include a number of sub-blocks, where each sub-block is defined by an associated pillar (e.g., a vertical conductive trace) extending from a shared bitline. Memory pages (also referred to herein as "pages") store one or more bits of binary data corresponding to data received from the host system. To achieve high density, a string of memory cells in a non-volatile memory device can be constructed to include a number of memory cells at least partially surrounding a pillar of poly-silicon channel material (i.e., a channel region). The memory cells can be coupled to access lines (i.e., wordlines) often fabricated in common with the memory cells, so as to form an array of strings in a block of memory (e.g., a memory array). The compact nature of certain non-volatile memory devices, such as 3D flash NAND memory, means wordlines are common to many memory cells within a block of memory. Some memory devices use certain types of memory cells, such as triple-level cell (TLC) memory cells, which store three bits of data in each memory cell, which make it affordable to move more applications from legacy hard disk drives to newer memory sub-systems, such as NAND solid-state drives (SSDs).

A memory sub-system can have a multi-plane memory die (e.g., N planes) including multiple blocks of memory cells arranged in multiple planes (e.g., a multi-plane memory device) for which multi-plane parity protection can be employed. Each block can be divided into multiple sub-blocks that each include multiple pages (e.g., three pages per sub-block).

Memory access operations (e.g., a program operation, an erase operation, etc.) can be executed with respect to the memory cells by applying a wordline bias voltage to wordlines to which memory cells of a selected page are connected. For example, during a programming operation, one or more selected memory cells can be programmed with the application of a program voltage to a selected wordline. In one approach, an Incremental Step Pulse Programming (ISPP) process or scheme can be employed to maintain a tight cell threshold voltage distribution for higher data reliability. In ISPP, a series of high-amplitude pulses of voltage levels having an increasing magnitude (e.g., where the magnitude of subsequent pulses are increased by a predefined pulse step height) are applied to wordlines to which one or more memory cells are connected to gradually raise the voltage level of the memory cells to above a wordline voltage level corresponding to the memory access operation (e.g., a target program level). The application of the uniformly increasing pulses by a wordline driver of the memory device enables the selected wordline to be ramped or increased to a wordline voltage level ($V_{wl}$) corresponding to a memory access operation. Similarly, a series of voltage pulses having a uniformly increasing voltage level can be applied to the wordline to ramp the wordline to the corresponding wordline voltage level during the execution of an erase operation.

Memory cells in a NAND array architecture can be configured, e.g., programmed, to a desired state. That is, electric charge can be placed on or removed from the floating gate of a memory cell to put the cell into a number of stored states. For example, a single level cell (SLC) can represent two binary states, e.g., 1 or 0. For example, a triple level cell (TLC) memory device stores TLC information using 3 bits of data per memory cell. The TLC memory device can be programmed using eight programming distributions (where level L0 is an erase level and levels L1 to L7 are respective programming levels. The state of a memory cell, e.g., the data stored in the cell, is determined by the threshold voltage (Vt).

Some memory sub-systems employ a cache program operation to improve bus efficiency. The cache program operation uses a page-sized cache storage to program pages of data within a block. The cache program operation allows the data associated with a program operation (i.e., the data to be programmed to the pages of the memory device) to be inserted into the cache storage (also referred to as "cache register") while the page buffer (also referred to as a "data register") is copied into the memory array. The cache program operation includes multiple data input breakpoints at which the data can be inputted to the memory pages. Using a cache program operation, initially data is copied into the cache storage. At a checkpoint, the data is transferred to the page buffer. The page data is then programmed from the page buffer into the memory array when the RB output returns to the ready (high) state. When the RB output returns to the ready state, another command can be issued to write new data to the cache storage. However, in so doing, the new data is committed to the memory array before the status of the programming (e.g., the verification status) of the previous data set is known or established. Therefore, when a failure occurs with respect to the programming of a later memory page, the data corresponding to prior pages has already been committed and the previous data has been overwritten in the cache storage, resulting in data recovery issues and degraded performance.

For example, execution of the cache program operation involves loading data associated with a first memory page (e.g., Page N) into the cache storage. The data associated with Page N is then transferred from the cache storage to the page buffer. The Page N data is then programmed into the array of the memory device and a next program operation is initiated to program the data for a next memory pages (e.g., Page N+1). Once the data is loaded into the page buffer, the memory device programs the data into the memory array. As soon as the cache storage is empty, the new or next cache program operation is initiated An in-progress or current cache program operation includes the management of storage space (i.e., cache storage) to enable the storing of data received from a host system that is to be programmed to subsequent pages of a memory device as part of a next or subsequent cache program operation. During execution of the current cache program operation, it is desirable to have data associated with a next cache program operation entered or stored in the cache storage as soon as possible due to throughput limitations of the I/O interface to the memory device. Accordingly, the cache storage is released during a current cache program operation such that the cache is ready to store the data received from the host system that is to be programmed to the one or more memory pages as part of the next cache program operation.

The cache storage may include a number of data caches (also referred to "primary data cache" or PDC). In an example memory sub-system, the cache storage consists of a latch or cache that is connected to the I/O interface (also referred to as the "I/O cache" or "secondary data cache (SDC)"). The cache storage may further include a first primary data cache (PDC0) for storing data associated with the lower memory pages, a second primary data cache (PDC1) for storing data associated with the upper memory pages, a third primary data cache (PDC2) for storing data associated with the extra memory pages. In some implementations, a fourth primary data cache (PDC3; also referred to as an "inhibit cache") is used to store inhibit data including a running count of memory cells that have reached a target program level. In this regard, the PDC3 stored information identifying the set of memory cells that have passed programming and for which further programming is to be inhibited.

The cache storage may be managed by setting an indicator associated with the cache (a cache ready indicator) to a 'ready' signal value to indicate to the host system that the cache storage is ready to receive and store data associated with a next cache program operation. Accordingly, at different points while the current cache program operation is in progress, the cache is released and ready to receive and store data associated with a next cache program operation.

To improve efficiency, the timing of the release of the cache storage controls when the host system can send the next set of data for the memory pages associated with the next cache program operation. For example, in certain typical memory sub-systems including one or more TLC memory devices, the cache storage is released after a level four (L4) pass for lower page (LP) data entries, after a level five (L5) pass for upper page (UP) data entries, and after a level six (L6) pass for extra page (XP) data entries. In this example, the cache ready indicator is set to the ready value to enable storing of the data associated with the lower pages of a next cache program operation at approximately 63% of the total programming time (tProg) of a current cache program operation. In this example, the cache is released for the upper page (UP) data of a next cache program operation at approximately 76% of the total programming time of the current cache program operation. Furthermore, in this example, the cache is released for the extra page (XP) data of the next cache program operation at approximately 91% of the total programming time of the current cache program operation. This enables the creation of storage space for the data associated with the respective pages of a next cache program operation at times prior to the completion of the current cache program operation. In this regard, it is desirable to free up or release the cache storage as soon as possible during a current cache program operation to enable storage of the data corresponding to the next cache program operation.

In certain memory sub-systems, in order to save physical space in the memory sub-system, fewer primary data caches may be used. For example, the inhibit cache or PDC3 that is used in some implementations may be removed in view of area considerations. Removal of the PDC3 results in the availability of a set of primary data caches such as PDC 0, PDC 1, and PDC 2 to store the data associated with the different memory page types and the inhibit data. In such implementations, with one less primary data cache available to store data, the timing of the cache release with respect to the page types is impacted. For example, the cache release associated with storage of the upper pages and the extra pages may both occur at approximately 91% of the total programming time. In addition, due to I/O interface latency (e.g., the time for the I/O interface to process the data and input the data into the memory array), the release of the cache in response to the storing of the data associated with the extra pages is observed at approximately 97% of the total programming time. As illustrated, the removal of a primary data cache leaving a set of primary data caches PDC0, PDC1, and PDC2 results in the release of the cache following storage of the upper pages and extra pages at a later time, as compared to memory sub-systems having the additional primary data cache (e.g., memory sub-systems having PDC0, PDC1, PDC2, and PDC3). The delayed timing of the release of the cache in memory sub-system with the PDC3 removed results in insufficient time for extra page data entries of a subsequent cache program operation to be completed before the current cache program operation is completed, thereby causing idle time and a reduction in throughput.

According to aspects of the present disclosure, a cache program operation (i.e., cache program operation N) is executed to enable a release of a cache storage at optimal times for storing data from a host system associated with a next or subsequent cache program operation (i.e., cache program operation N+1), where the cache storage includes a reduced set of latches or caches (e.g., PDC0, PDC1, and PDC2) to optimize area considerations. In an embodiment, the cache program operation includes a data encoding sub-operation and multiple cache release sub-operations to enable the efficient storage of data associated with the subsequent cache program operation while the current or in-progress cache program operation is being executed. In an embodiment, the data encoding sub-operation generates a first encoded data value and a second encoded data value for each memory cell being programmed as part of the current cache program operation. For each memory cell, the combination of the first encoded data value and the second encoded data value indicates state information for each respective memory cell. The state information is used to determine how each memory cell is to be handled during the current cache program operation. For example, the state information identified based on the combination of the first encoded data value and the second encoded data value can indicate that a memory cell is to be programmed to a particular programming level (e.g., L6, L6 with SSPC processing, or L7) or has already passed programming (i.e., passed a program verify operation associated with a prior programming loop associated with a programming level (e.g., L1 to L5).

In an embodiment, the set of first encoded data values are stored in the first data cache (PDC0) of the cache storage and the set of second encoded data values are stores in the second data cache (PDC1) of the cache storage. Advantageously, the generating of the encoded data and storing in PDC0 and PDC1 enables the third data cache (PDC2) to be available or free to store data associated with a next cache program operation.

In an embodiment, at a first time during the current cache program operation, a first cache release sub-operation is executed to generate a first cache ready signal to indicate to a host system that first data associated with the next cache program operation (e.g., LP (N+1) data) can be sent to an input/output (I/O) cache. In an embodiment, at a second time during the current cache program operation, a second cache release sub-operation is executed to generate a second cache ready signal to indicate to a host system that second data associated with the next cache program operation (e.g., UP (N+1) data) can be sent to the I/O cache. In an embodiment, the first data associated with the next cache program operation can be moved from the I/O cache to the third data cache of the cache storage (PDC2) prior to the storing of the second data in the I/O cache.

In an embodiment, at a third time during the current cache program operation, a third cache release sub-operation is executed to generate a third cache ready signal to indicate to a host system that third data associated with the next cache program operation (e.g., XP (N+1) data) can be sent to the I/O cache. In an embodiment, the first cache release sub-operation is executed after program level four (L4) passes to release the cache and enable storage of the data associated with the lower page (LP) data of the next cache program operation at approximately 57% of the total programming time (tProg) of a current cache program operation. In an embodiment, the second cache release sub-operation is executed after level five (L5) passes to release the cache and enable storage of the upper page (UP) data of the next cache program operation at approximately 75% of the total programming time of the current cache program operation. In an embodiment, the third cache release sub-operation is executed after level six (L6) passes to release the cache and enable storage of the extra page (XP) data of the next cache program operation at approximately 88% of the total programming time of the current cache program operation.

Advantageously, the freeing of the third data cache (PDC2) resulting from the use only PDC0 and PDC1 to store the encoded data values associated with the memory cells enables the multiple cache release sub-operations to be executed at optimized times during the execution of the current cache program operation. Accordingly, the "early" release of the cache storage results in the "early" storage of the second data and the third data associated with next cache program operation, as compared to a typical cache program operation.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory device(s) 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory device(s) 130 can be grouped as pages that can refer to a logical unit of the memory device used to store data. With some types of memory (e.g., NAND), pages can be grouped to form blocks. In one embodiment, the term "MLC memory" can be used to represent any type of memory cell that stores more than one bit per cell (e.g., 2 bits, 3 bits, 4 bits, or 5 bits per cell).

Although non-volatile memory components such as 3D cross-point array of non-volatile memory cells and NAND type flash memory (e.g., 2D NAND, 3D NAND) are described, the memory device(s) 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device(s) 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In one embodiment, memory device(s) 130 includes a program manager 134 configured to carry out corresponding memory access operations (e.g., cache program operations with a data encoding sub-operation to enable "early" cache release sub-operations), in response to receiving the memory access commands from memory interface 113. In some embodiments, local media controller 135 includes at least a portion of the program manager 134 and is configured to perform the functionality described herein. In some embodiments, program manager 134 is implemented on memory device 130 using firmware, hardware components, or a combination of the above. In one embodiment, the program manager 134 receives, from a requestor, such as memory interface 113, a request to program data associated with a set of memory cells of a memory array of memory device(s) 130, where the memory blocks being programmed are located in different memory planes. In an embodiment, the program manager 134 executes a cache program operation including a data encoding sub-operation and multiple cache release sub-operations.

The program manager 134 executes the cache program operation (i.e., cache program operation N) including cache release sub-operations to enable "early" release of the cache storage for storing data from a host system associated with a next or subsequent cache program operation (i.e., cache program operation N+1). The program manager 134 manages the cache storage includes a set of three data cachees (e.g., primary data cache 0 (PDC0), PDC1, and PDC2) and an input/output (I/O) cache configured to store data transmitted via the I/O interface between the memory device and the host system. In an embodiment, the program manager

134 executes a data encoding sub-operation and multiple cache release sub-operations to enable the efficient storage of data associated with the subsequent cache program operation while the current or in-progress cache program operation is being executed. In an embodiment, the program manager 134 executes the data encoding sub-operation to generate a first encoded data value and a second encoded data value for each memory cell being programmed as part of the current cache program operation. In an embodiment, the program manager 134 determines a combined value including the first encoded data value and the second encoded data value for each memory cell to determine state information for each respective memory cell. The program manager 134 uses the state information to determine how each memory cell is to be handled during the current cache program operation. The state information represented by the combination of encoded data values for each memory cell indicate whether the memory cell is to be programmed to a particular programming level (e.g., L6, L6 with SSPC processing, or L7) or has already passed programming (i.e., passed a program verify operation associated with a prior programming loop associated with a programming level (e.g., L1 to L5).

In an embodiment, the program manager 134 causes the set of first encoded data values to be stored in the first data cache (PDC0) of the cache storage and the set of second encoded data values to be stored in the second data cache (PDC1) of the cache storage. Advantageously, storing the encoded data in PDC0 and PDC1 enables the third data cache (PDC2) to be available or free to store data associated with a next cache program operation.

In an embodiment, at a first time during the current cache program operation (e.g., after L4 programming passes), the program manager 134 executes a first cache release sub-operation to generate a first cache ready signal to indicate to a host system that first data associated with the next cache program operation (e.g., LP (N+1) data) can be sent to the I/O cache. In an embodiment, at a second time during the current cache program operation (e.g., after L5 programming passes), the program manager 134 executes a second cache release sub-operation to generate a second cache ready signal to indicate to a host system that second data associated with the next cache program operation (e.g., UP (N+1) data) can be sent to the I/O cache. In an embodiment, the program manager 134 can cause the first data associated with the next cache program operation to be moved from the I/O cache to the third data cache of the cache storage (PDC2) prior to the storing of the second data in the I/O cache.

In an embodiment, at a third time during the current cache program operation (e.g., after L6 programming passes), the program manager 134 executes a third cache release sub-operation to generate a third cache ready signal to indicate to a host system that third data associated with the next cache program operation (e.g., XP (N+1) data) can be sent to the I/O cache. Advantageously, the program manager 134 executes the first cache release sub-operation to release the cache and enable storage of the data associated with the lower page (LP) data of the next cache program operation at approximately 57% of the total programming time (tProg) of a current cache program operation. In addition, the program manager 134 executes the second cache release sub-operation to allow for the "early" release of the cache to enable storage of the upper page (UP) data of the next cache program operation at approximately 75% of the total programming time of the current cache program operation. Furthermore, the program manager 134 executes the third cache release sub-operation to allow for the "early" release of the cache to enable storage of the extra page (XP) data of the next cache program operation at approximately 88% of the total programming time of the current cache program operation.

Figure 1B:
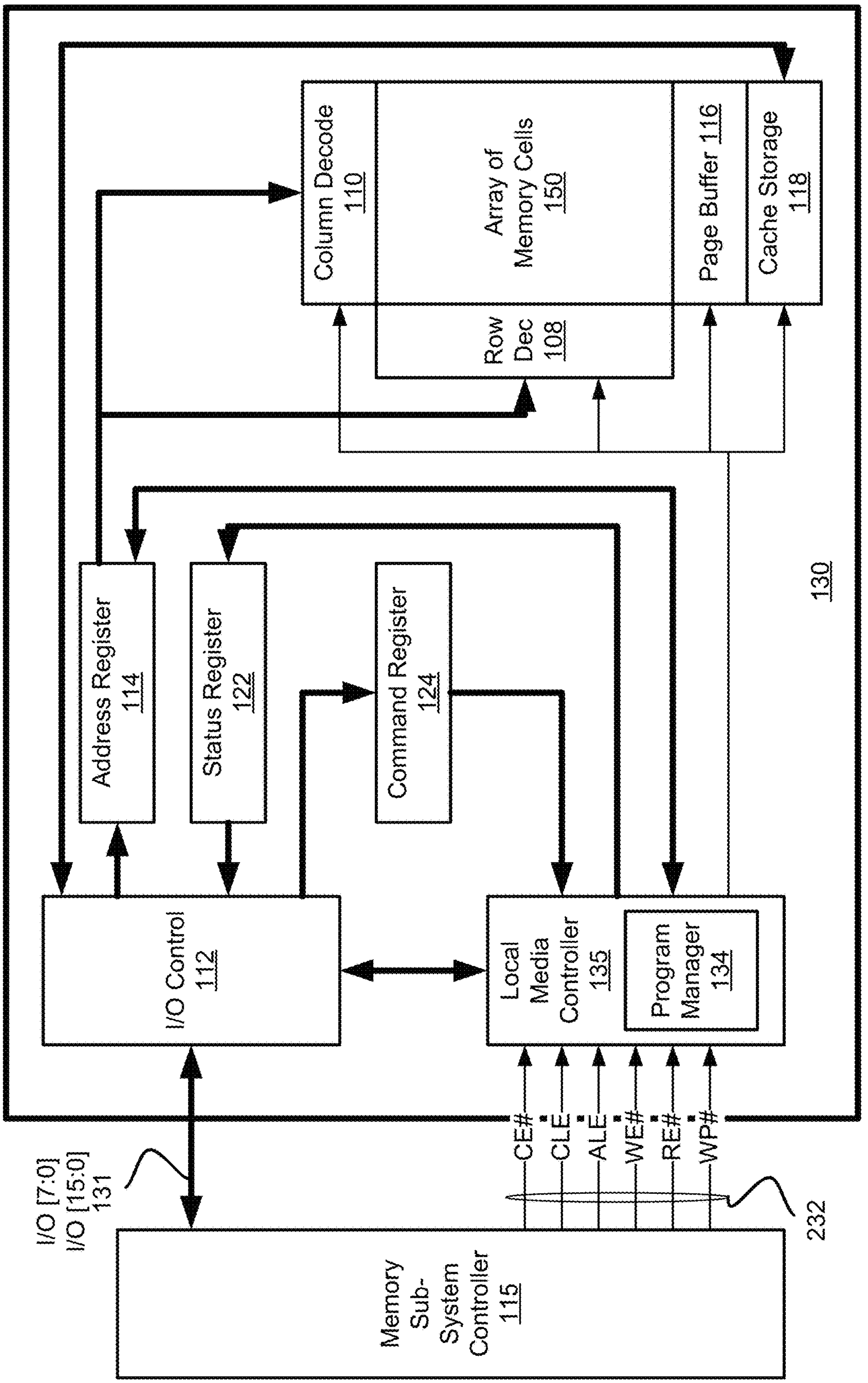
FIG. 1B is a block diagram of memory device(s) in communication with a memory sub-system controller of a memory sub-system in accordance with one or more embodiments of the present disclosure.

FIG. 1B is a simplified block diagram of a first apparatus, in the form of a memory device(s) 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device(s) 130), may be a memory controller or other external host device.

Memory device 130 includes an array of memory cells 150 logically arranged in rows and columns. Memory cells of a logical row are typically connected to the same access line (e.g., a wordline) while memory cells of a logical column are typically selectively connected to the same data line (e.g., a bitline). A single access line may be associated with more than one logical row of memory cells and a single data line may be associated with more than one logical column. Memory cells (not shown in FIG. 1B) of at least a portion of array of memory cells 250 are capable of being programmed to one of at least two target data states.

Row decode circuitry 108 and column decode circuitry 110 are provided to decode address signals. Address signals are received and decoded to access the array of memory cells 150. Memory device(s) 130 also includes input/output (I/O) control circuitry 112 to manage input of commands, addresses and data to the memory device(s) 130 as well as output of data and status information from the memory device 130. An address register 114 is in communication with I/O control circuitry 212 and row decode circuitry 108 and column decode circuitry 110 to store or latch the address signals prior to decoding. A command register 124 is in communication with I/O control circuitry 112 and local media controller 135 to store or latch incoming commands.

A controller (e.g., the local media controller 135 internal to the memory device 130) controls access to the array of memory cells 150 in response to the commands and generates status information for the external memory sub-system controller 115, i.e., the local media controller 135 is configured to perform access operations (e.g., read operations, programming operations and/or erase operations) on the array of memory cells 150. The local media controller 135 is in communication with row decode circuitry 108 and column decode circuitry 110 to control the row decode circuitry 108 and column decode circuitry 110 in response to the addresses. In one embodiment, local media controller 135 includes the program manager 134, which can implement the multi-plane program operation including execution of a QPT sub-operation and a lagging plane boost sub-operation to identify and isolate non-defective memory blocks and one or more defective blocks of memory device(s) 130, as described herein.

The local media controller 135 is also in communication with a cache storage 118. Cache storage 118 stores or latches data, either incoming or outgoing, as directed by the local media controller 135 to temporarily store data while the array of memory cells 150 is busy writing or reading, respectively, other data. During a program operation (e.g., write operation), data may be passed from the cache storage 118 to the page buffer 116 for transfer to the array of memory cells 150; then new data may be stored or latched in the cache storage 118 from the I/O control circuitry 212. During a read operation, data may be passed from the cache storage 118 to the I/O control circuitry 112 for output to the memory sub-system controller 115; then new data may be passed from the page buffer 116 to the cache storage 118. The cache storage 118 and/or the page buffer 116 may form (e.g., may form a portion of) a page buffer of the memory device(s) 130. A page buffer may further include sensing devices (not shown in FIG. 1B) to sense a data state of a memory cell of the array of memory cells 150, e.g., by sensing a state of a data line connected to that memory cell. A status register 122 may be in communication with I/O control circuitry 112 and the local memory controller 135 to store or latch the status information for output to the memory sub-system controller 115.

Memory device(s) 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device(s) 130, such as a cache ready signal, described in greater detail below. In one embodiment, memory device 130 receives command signals (which represent commands), address signals (which represent addresses), and data signals (which represent data) from the memory sub-system controller 115 over a multiplexed input/output (I/O) bus 131 and outputs data to the memory sub-system controller 115 over I/O bus 131.

For example, the commands may be received over input/output (I/O) pins [7:0] of I/O bus 131 at I/O control circuitry 112 and may then be written into command register 124. The addresses may be received over input/output (I/O) pins [7:0] of I/O bus 234 at I/O control circuitry 112 and may then be written into address register 114. The data may be received over input/output (I/O) pins [7:0] for an 8-bit device or input/output (I/O) pins [15:0] for a 16-bit device at I/O control circuitry 112 and then may be written into cache storage 118. The data may be subsequently written into page buffer 116 for programming the array of memory cells 150.

In an embodiment, cache storage 118 may be omitted, and the data may be written directly into page buffer 116. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the example memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2A:
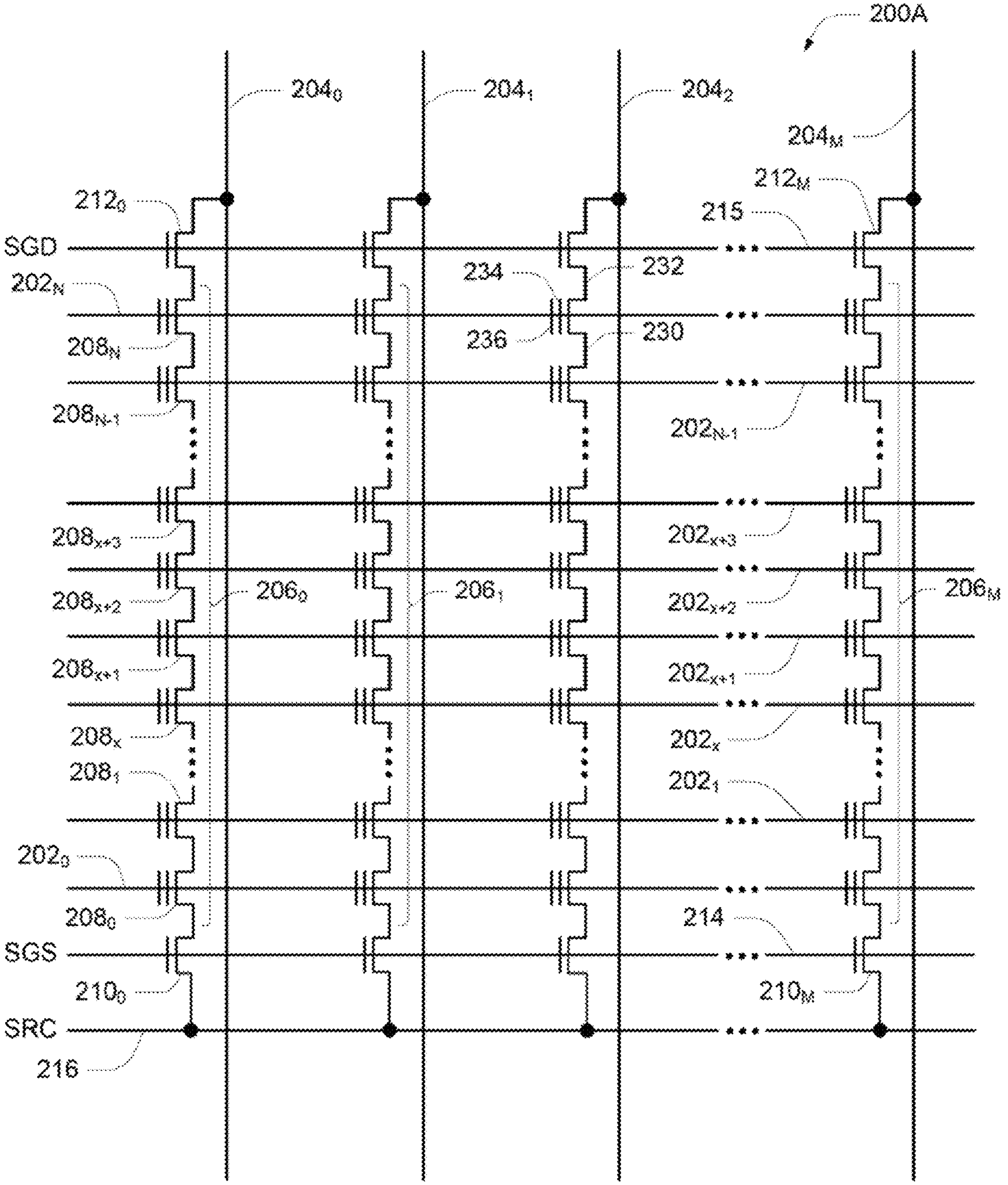
FIG. 2A-2C are schematics of portions of an array of memory cells as could be used in a memory of the type described with reference to FIG. 1B according to one or more embodiment.
Figure 2B:
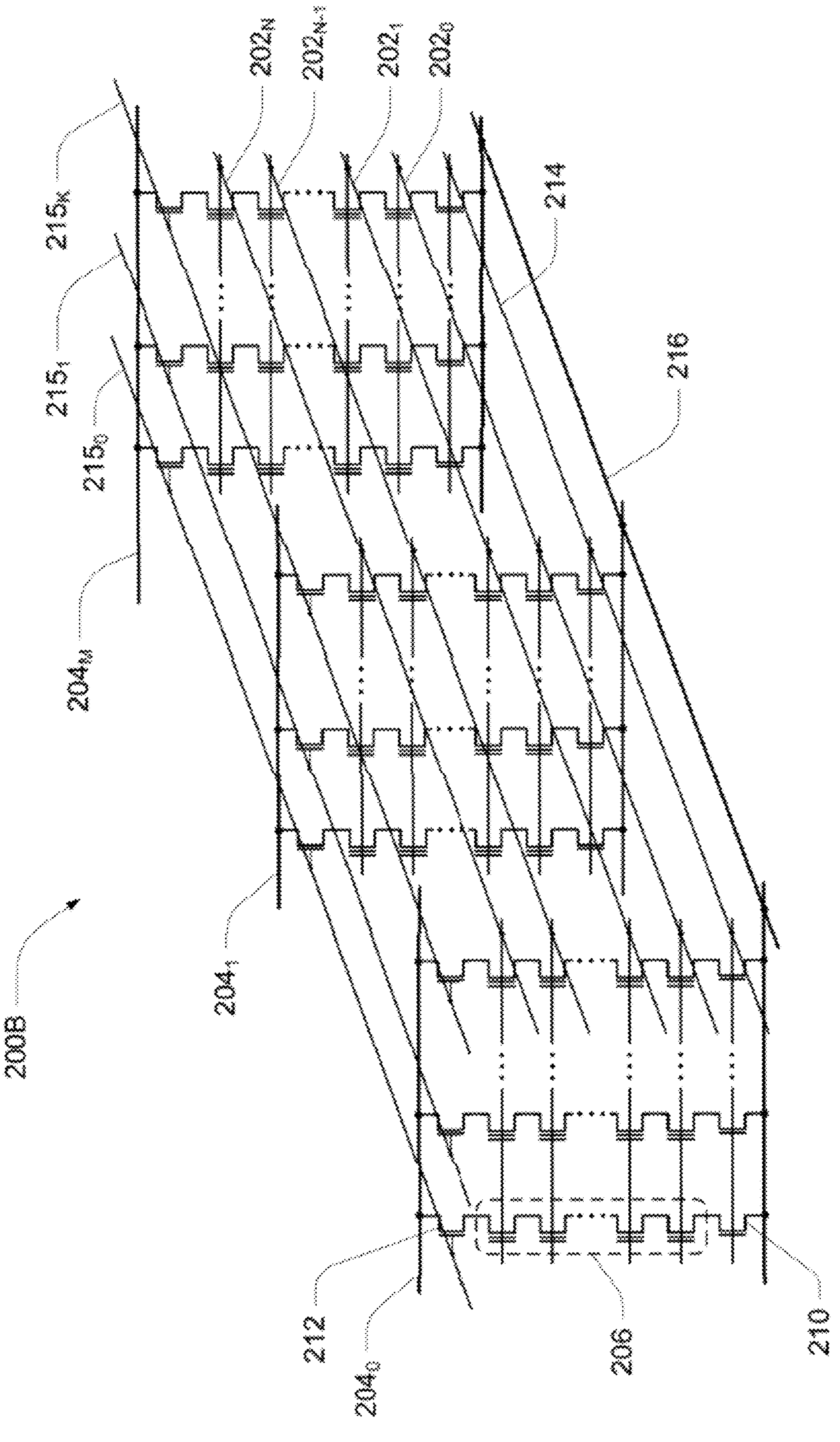
Figure 2C:
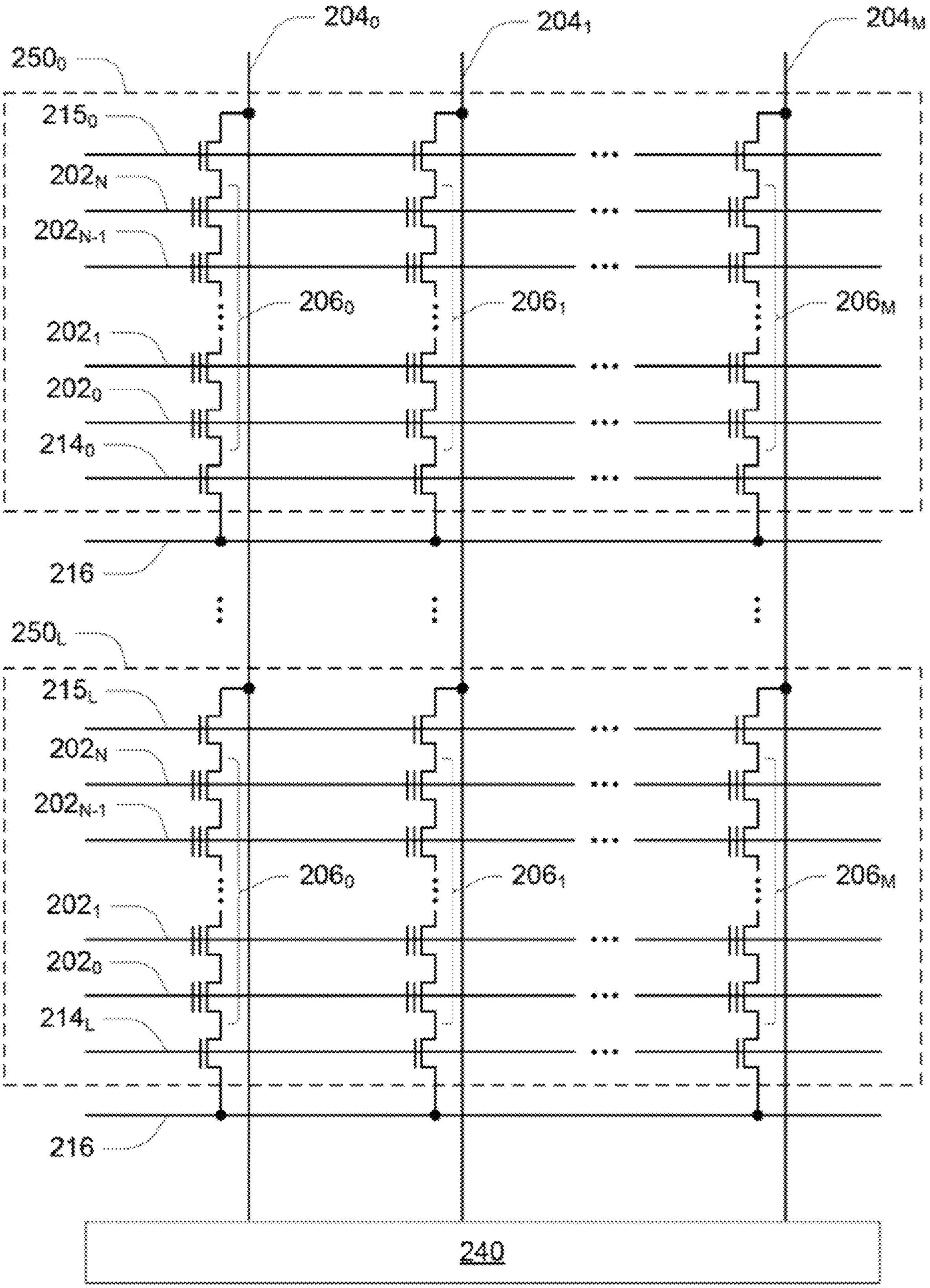

FIG. 2A-2C are schematics of portions of an array of memory cells 200A, such as a NAND memory array, as could be used in a memory of the type described with reference to FIG. 1B according to an embodiment, e.g., as a portion of the array of memory cells 104. Memory array 200A includes access lines, such as wordlines $\mathbf{202}_0$ to $\mathbf{202}_N$, and data lines, such as bitlines $\mathbf{204}_0$ to $\mathbf{204}_M$. The wordlines 202 can be connected to global access lines (e.g., global wordlines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a wordline 202) and columns (each corresponding to a bitline 204). Each column can include a string of series-connected memory cells (e.g., non-volatile memory cells), such as one of NAND strings $\mathbf{206}_0$ to $\mathbf{206}_M$. Each NAND string 206 can be connected (e.g., selectively connected) to a common source (SRC) 216 and can include memory cells $\mathbf{208}_0$ to $\mathbf{208}_N$. The memory cells 208 can represent non-volatile memory cells for storage of data. The memory cells 208 of each NAND string 206 can be connected in series between a select gate 210 (e.g., a field-effect transistor), such as one of the select gates $\mathbf{210}_0$ to $\mathbf{210}_M$ (e.g., that can be source select transistors, commonly referred to as select gate source), and a select gate 212 (e.g., a field-effect transistor), such as one of the select gates $\mathbf{212}_0$ to $\mathbf{212}_M$ (e.g., that can be drain select transistors, commonly referred to as select gate drain). Select gates $\mathbf{210}_0$ to $\mathbf{210}_M$ can be commonly connected to a select line 214, such as a source select line (SGS), and select gates $\mathbf{212}_0$ to $\mathbf{212}_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $\mathbf{208}_0$ of the corresponding NAND string 206. For example, the drain of select gate $\mathbf{210}_0$ can be connected to memory cell $\mathbf{208}_0$ of the corresponding NAND string $\mathbf{206}_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $\mathbf{212}_0$ can be connected to the bitline $\mathbf{204}_0$ for the corresponding NAND string $\mathbf{206}_0$. The source of each select gate 212 can be connected to a memory cell $\mathbf{208}_N$ of the corresponding NAND string 206. For example, the source of select gate $\mathbf{212}_0$ can be connected to memory cell $\mathbf{208}_N$ of the corresponding NAND string $\mathbf{206}_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap layer, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bitline 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $\mathbf{202}_N$ and selectively connected to even bitlines 204 (e.g., bitlines $\mathbf{204}_0$, $\mathbf{204}_2$, $\mathbf{204}_4$, etc.) can be one physical page of the memory cells 208 (e.g., even memory cells) while memory cells 208 commonly connected to wordline $\mathbf{202}_N$ and selectively connected to odd bitlines 204 (e.g., bitlines $\mathbf{204}_1$, $\mathbf{204}_3$, $\mathbf{204}_5$, etc.) can be another physical page of the memory cells 208 (e.g., odd memory cells).

Although bitlines $\mathbf{204}_3$-$\mathbf{204}_5$ are not explicitly depicted in FIG. 2A, it is apparent from the figure that the bitlines 204 of the array of memory cells 200A can be numbered consecutively from bitline $\mathbf{204}_0$ to bitline $\mathbf{204}_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $\mathbf{202}_0$-$\mathbf{202}_N$ (e.g., all NAND strings 206 sharing common wordlines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

FIG. 2B is another schematic of a portion of an array of memory cells 200B as could be used in a memory of the type described with reference to FIG. 1B, e.g., as a portion of the array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars where a portion of a pillar can act as a channel region of the memory cells of NAND strings 206. The NAND strings 206 can be each selectively connected to a bitline $\mathbf{204}_0$-$\mathbf{204}_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $\mathbf{215}_0$-$\mathbf{215}_K$ to selectively activate particular select transistors 212 each between a NAND string 206 and a bitline 204. The select transistors 210 can be activated by biasing the select line 214. Each wordline 202 can be connected to multiple rows of memory cells of the memory array 200B. Rows of memory cells that are commonly connected to each other by a particular wordline 202 can collectively be referred to as tiers.

FIG. 2C is a further schematic of a portion of an array of memory cells 200C as could be used in a memory of the type described with reference to FIG. 1B, e.g., as a portion of the array of memory cells 104. Like numbered elements in FIG. 2C correspond to the description as provided with respect to FIG. 2A. The array of memory cells 200C can include strings of series-connected memory cells (e.g., NAND strings) 206, access (e.g., word) lines 202, data (e.g., bit) lines 204, select lines 214 (e.g., source select lines), select lines 215 (e.g., drain select lines) and a source 216 as depicted in FIG. 2A. A portion of the array of memory cells 200A can be a portion of the array of memory cells 200C, for example.

FIG. 2C depicts groupings of NAND strings 206 into blocks of memory cells 250, e.g., blocks of memory cells $\mathbf{250}_0$-$\mathbf{250}_L$. Blocks of memory cells 250 can be groupings of memory cells 208 that can be erased together in a single erase operation, sometimes referred to as erase blocks. Each block of memory cells 250 can represent those NAND strings 206 commonly associated with a single select line 215, e.g., select line $\mathbf{215}_0$. The source 216 for the block of memory cells $\mathbf{250}_0$ can be a same source as the source 216 for the block of memory cells $\mathbf{250}_L$. For example, each block of memory cells $\mathbf{250}_0$-$\mathbf{250}_L$ can be commonly selectively connected to the source 216. Access lines 202 and select lines 214 and 215 of one block of memory cells 250 can have no direct connection to access lines 202 and select lines 214 and 215, respectively, of any other block of memory cells of the blocks of memory cells $\mathbf{250}_0$-$\mathbf{250}_L$.

The bitlines $\mathbf{204}_0$-$\mathbf{204}_M$ can be connected (e.g., selectively connected) to a buffer portion 240, which can be a portion of the page buffer 152 of the memory device 130. The buffer portion 240 can correspond to a memory plane (e.g., the set of blocks of memory cells $\mathbf{250}_0$-$\mathbf{250}_L$). The buffer portion 240 can include sense circuits (which can include sense amplifiers) for sensing data values indicated on respective bitlines 204.

Figure 2D:
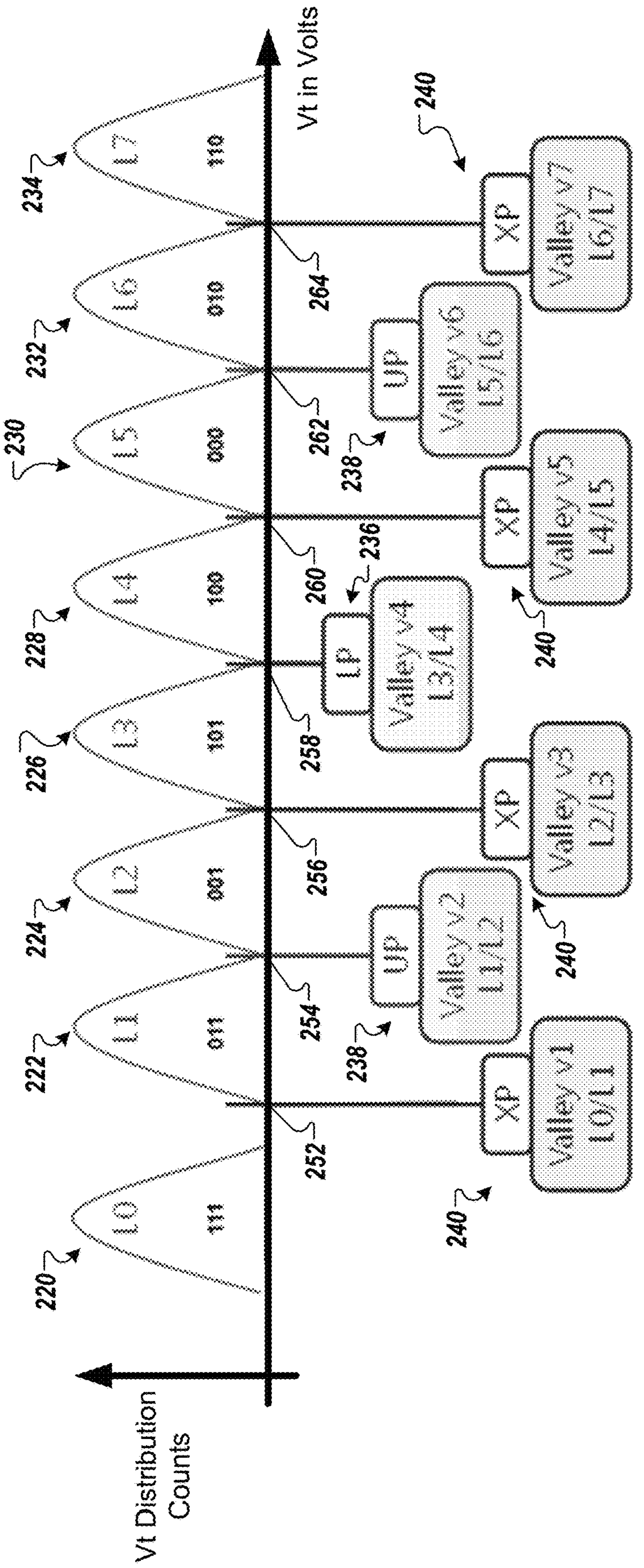
FIG. 2D illustrates example programming distributions of memory device(s), in accordance with one or more embodiments of the present disclosure.

FIG. 2D illustrates an example set of programming distributions of a TLC memory device with eight programming distributions, in accordance with some embodiments of the present disclosure. A memory block with TLC memory cells stores TLC information using 3 bits of data per cell. As illustrated in FIG. 2D, this is accomplished using eight programming distributions 220-234. A lower page (LP) is defined with one read level threshold 236. An upper page (UP) is defined with two read level thresholds 238. An extra page (XP) is defined with fourth read level thresholds 240. The eight programming distributions 220-234 each correspond to a level (L0:L7), each level corresponding to a code (000b:111b). Between each pair of eight programming distributions is a valley, totaling seven valleys (v1:v7). A center of each programming distribution 220-234 corresponds to a PV target for the respective programming distribution 220-232. In total, there can be seven PV targets (L1-L7) and seven read level thresholds 252-264. In addition, between pairs of adjacent programming distributions there is a relative width (also referred to as "valley margin" or "margin" herein). For example, valley margins associated with a particular logical page type can indicate the relative width between pairs of programming distributions associated with the particular logical page type. For instance, a first valley margin of an upper logical page (e.g., valley 2 that is between the 2nd distribution (L1) and 3rd distribution (L2)) that is larger than a second valley margin of the upper logical page (e.g., valley 6 that is between the sixth distribution (L5) and the seventh distribution (L6)) can indicate that the first valley is larger than the second valley (e.g., valley 2 is larger than valley 3), but does not explicitly recite the absolute width or size of either valley.

In the embodiment depicted in FIG. 2D, each PV target can be set in a default state as defined by factory settings. In some cases, all PV targets are adjusted, but in other embodiments, the first PV target and the last PV target can be fixed, allowing the intervening PV targets to be adjusted. For example, with seven PV targets (L1-L7), the L1 and L7 PV targets are fixed and the other PV targets L2 through L6 can receive characterized starting values, leading to faster cRLC and dynamic program targeting (DPT) algorithm conversion. Alternatively, the L1, and L7 PV targets are fixed and the other PV targets L2-L6 can be adjusted. These factory settings of the PV targets and read thresholds may produce undesirable BER results before cRLC and dynamic program targeting (DPT) operations. It should be noted that in some cases, the first programming distribution 220, corresponding to the first level L0, has a fixed PV target. Similarly, the eighth programming distribution 234, corresponding to the eighth level L7, can have a fixed PV target.

FIG. 3 is a block schematic of a portion of an array of memory cells 300 as could be used in a memory of the type described with reference to FIG. 1B. The array of memory cells 300 is depicted as having four memory planes 350 (e.g., memory planes $\mathbf{350_0}$-$\mathbf{350_3}$), each in communication with a respective buffer portion 240, which can collectively form a page buffer 352. While four memory planes 350 are depicted, other numbers of memory planes 350 can be commonly in communication with a page buffer 352. Each memory plane 350 is depicted to include L+1 blocks of memory cells 250 (e.g., blocks of memory cells $\mathbf{250_0}$-$\mathbf{250_0}$.

Figure 4:
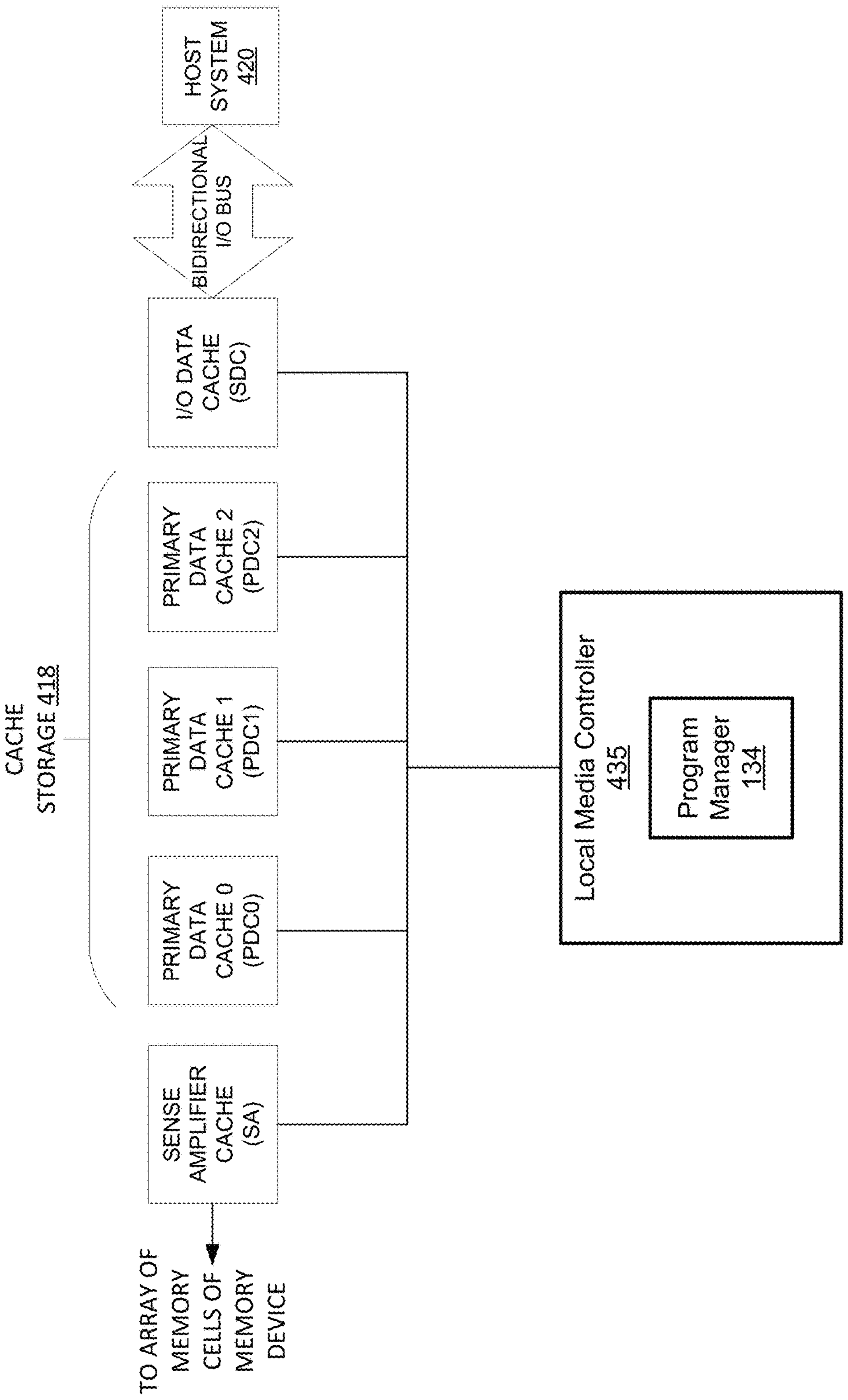
FIG. 4 illustrates a block diagram of components of one or more memory devices including a local media controller with a program manager configured to execute a cache program operation including data encoding, in accordance with one or more embodiments of the present disclosure.

FIG. 4 illustrates a diagram of components of one or more memory devices including a local media controller 435 with a program manager 134 configured to execute a cache program operation including data encoding, in accordance with embodiments of the present disclosure. As shown in FIG. 4, the program manager 134 is operatively coupled to an I/O data cache (also referred to as a second data cache (SDC), a cache storage 418, and a sense amplifier cache (SA cache). In an embodiment, the cache storage 418 (e.g., cache storage 118 of FIG. 1B) includes a first data cache (also referred to as a first primary data cache or PDC0), a second data cache (also referred to as a second primary data cache or PDC1) and a third data cache (also referred to as a third primary data cache or PDC2). The first data cache, second data cache and third data cache of the cache storage 400 are configured to store data associated with the execution of a current or in-progress cache program operation (also referred to as "cache program operation N") executed by the program manager 134 and a next or subsequent cache program operation (also referred to as "cache program operation N+1) executed by the program manager 134.

The cache program operation is executed by the program manager 134 to program a set of memory cells of one or more memory devices to a respective target programming level of a set of programming levels (e.g., programming levels L1 to L7 for a TLC memory device). In an embodiment, the cache program operation is executed to program the memory cells of the different page types (e.g., lower pages (LP), upper pages (UP) and extra pages (XP)) of the memory device. In an embodiment, the cache program operation enables the programming of the memory cells of the pages of the memory device based on data received from the host system 430. Accordingly, each memory cell of the respective pages (e.g., LP, UP, XP) is associated with a target programming level (e.g., L1 to L7 for a TLC memory device). The cache program operation includes selective slow program convergence (SSPC) processing to optimize program threshold voltage (Vt) distribution width of the set of programming distributions associated with the set of programming levels. The SSPC processing is performed as part of the cache program operation to program certain memory cells of the memory array. For example, the SSPC processing can be performed on a first set of memory cells to program those memory cells to a target level (e.g., L6). In this example, the memory cells programmed to L6 using the SSPC processing are referred to as L6 SSPC memory cells.

In an embodiment, the sense amplifier (SA) is configured to sense the array of memory cells of the memory device to obtain information about the state or condition of the memory array. For example, the sense amplifier (SA) can detect a value associated with a memory cell which represents a result of a program verify operation associated with a corresponding programming level to determine if that memory cell has passed programming for that particular programming level. In an embodiment, the sense amplifier can sense and store a value for each memory cell which indicates if the memory cell has passed programming (i.e., the memory cell is to be inhibited such that no further programming of that memory cell is performed) or has not yet passed programming and remains a target memory cell (i.e., a memory cell to be programmed) and subject to subsequent processing in accordance with the current cache program operation.

In an embodiment, the program manager 134 executes the cache program operation including sub-operations relating to the generation, storage and movement of data using the I/O data cache, the first primary data cache (PDC0), the second primary data cache (PDC1), and the third primary data cache (PDC2), and the sense amplifier cache, as described in detail with respect to FIGS. 5-9. In an embodiment, the cache program operation (i.e., cache program operation N) includes sub-operations to enable early release of the cache storage 400 to allow data associated with the next or subsequent cache program operation (i.e., cache program operation N+1) to be stored in the cache storage 400 prior to completion of the in-progress cache program operation.

Figure 5:
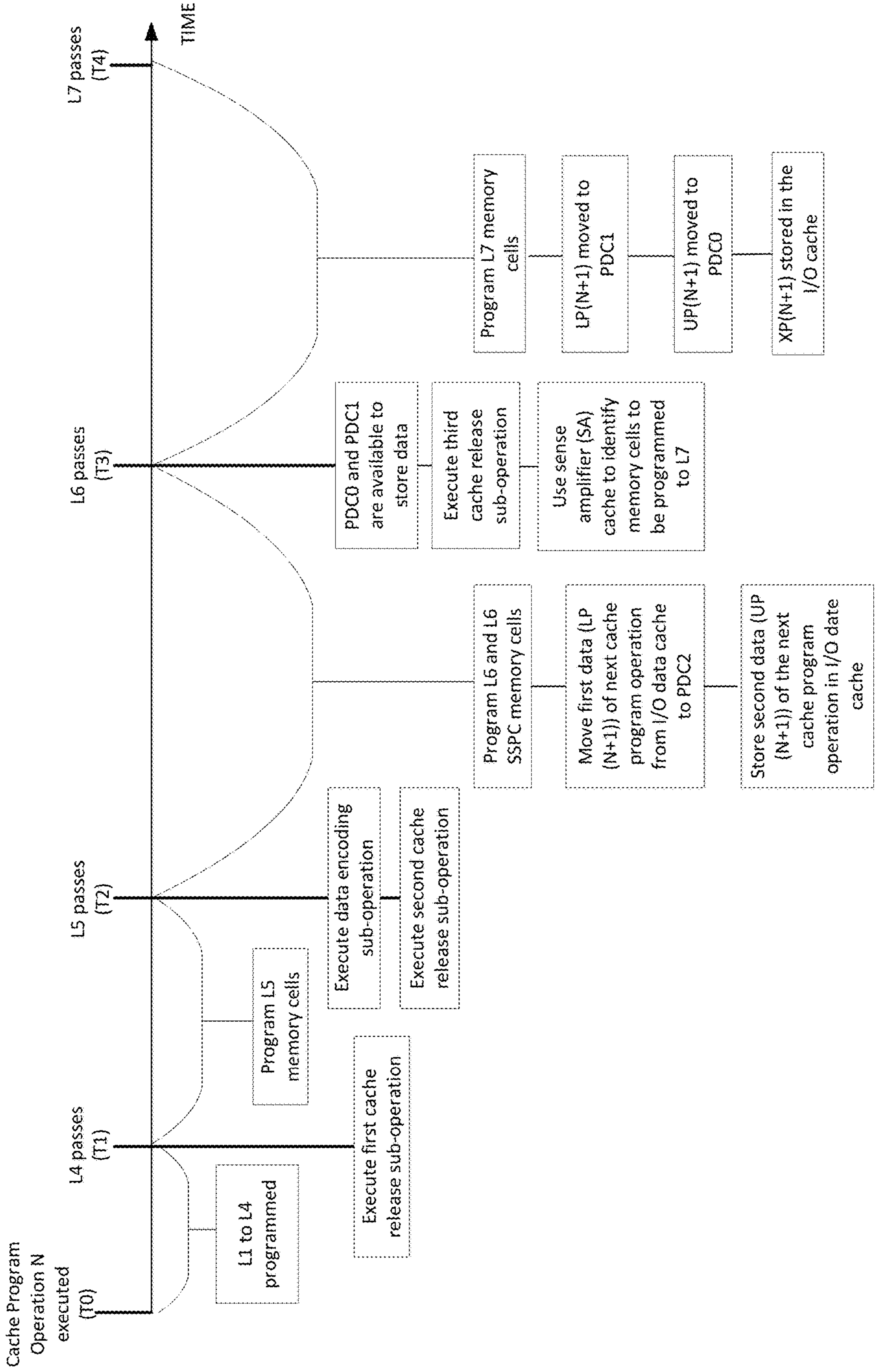
FIG. 5 illustrates an example timeline associated with the execution of an example cache program operation, according to one or more embodiments of the present disclosure.

In an embodiment, the cache program operation includes sub-operations to program a set of memory cells of memory pages (e.g., LPs, UPs, and XPs) of one or more memory devices to respective target programming levels of a set of programming levels. FIG. 5 illustrates an example timeline associated with the execution of an example cache program operation, according to embodiments of the present disclosure. As shown in FIG. 5, in an embodiment, the cache program operation N is executed at time TO. During a time period between T0 and T1, the first four programming levels (i.e., levels L1 to L4 of a TLC memory device) are programmed in accordance with typical sub-operations of a programming algorithm (e.g., application of incrementally-increasing programming pulses and corresponding program verify sub-operations to program memory cells targeted to one of the first four programming levels).

In an embodiment, at time T1, after the programming of the L4 memory cells completes (i.e., after L4 passes), a first cache release sub-operation of the current cache program operation is executed. In an embodiment, the first cache release sub-operation includes the generating of a cache ready signal that indicates to the host system that first data associated with the next cache program operation can be loaded and stored in the I/O cache. In an embodiment, the first data includes the LP data for the next cache program operation (i.e., LP(N+1)). In an embodiment, after L4 passes, the first data cache (PDC0) stores data identifying the memory cells of the upper pages (UP) that are targeted for L5 programming, the second data cache (PDC1) stores data identifying the memory cells of the extra pages (XP) that are targeted from L5 programming, and the third data cache (PDC3) stores data identifying the memory cells to be programmed to the L5 SSPC level. In an embodiment, a time of the cache ready signal of the first cache release sub-operation enabling the storage of the first data associated with the next cache program operation (e.g., LP(N+1) data) is generated is approximately 57% of the total programming time (tProg).

In an embodiment, during a time period between T1 and T2, execution of the cache program operation includes the L5 programming phase or loop to program memory cells targeted to the L5 programming level. After L5 passes (time T2), a data encoding sub-operation of the cache program operation is executed. The data encoding sub-operation includes the generating of encoded data values (encoded data value A and encoded data value B) to be stored in PDC0 and PDC1. In an embodiment, encoded data value A is stored in PDC0 and encoded data value B is stored in PDC1. In an embodiment, encoded data value A and encoded data value B can have a value of either "0" or "1". For each memory cell, the combination of encoded data value A and encoded data value B identifies a state or condition associated with the memory cell. For example, the combination of the encoded values can identify a memory cell as being one of the following: a memory cell to be programmed to L6, a memory cell to be programmed to L7, a memory cell to be programmed to L6 SSPC, a memory cell that is already programmed (i.e., programmed to L1 to L5) and is to be inhibited. In an embodiment, the encoded data construct includes four different combinations of encoded data value A and encoded data value B, each one corresponding to a respective state or condition as described above. An example data structure including an encoding construct in accordance with the encoding sub-operation is described in greater detail below with reference to FIG. 6.

FIG. 6 illustrates an example data structure including the encoded data generated by a program manager during execution of a cache program operation (also referred to as "cache program operation N" or a "current cache program operation"), according to embodiments of the present disclosure. In an embodiment, the encoded data is used to represent a state or condition of portions of memory cells that are to be programmed in accordance with the cache program operation. In an embodiment, the first primary data cache (PDC0) is used to store a first encoded data value (i.e., encoded data value A) and the second primary data cache (PDC1) is used to store a second encoded data value (i.e., encoded data value B). In an embodiment, encoded data value A and encoded data value B are used to represent a state or condition of the respective memory cells during a current or in-progress cache program operation.

As shown in the example data structure of FIG. 6, memory cells to be programmed to L6 (i.e., have not yet passed the target L6 programming level) are encoded with an encoded data value A of "0" (stored in PDC 0) and an encoded data value B of "0" (stored in PDC 1). As shown, memory cells to be programmed to L7 are encoded with an encoded data value A of "1" and an encoded data value B of "0". In an embodiment, the level 6 SSPC memory cells that need to be programmed are encoded with encoded data value A of "0" and an encoded data value B of "1". In an embodiment, the memory cells that have passed programming and are to be inhibited (i.e., inhibit cells) are encoded with an encoded data value A of "1" and an encoded data value B of "1". In an embodiment, since two data caches (i.e., PDC0 and PDC1) are used, four combinations of encoded data values can be represented. Accordingly, in an embodiment, level 7 SSPC cells are dropped from the encoding construct due to the lack of data cache space.

In an embodiment, the program manager 134 can determine the combined value of encoded data value A and encoded data value B for each memory cell to identify the corresponding state or condition of each respective memory cell. FIG. 7 illustrates an example data structure including a set of memory cells (i.e., memory cell 1, memory cell 2, memory cell 3 . . . memory cell X), the corresponding encoded data value combination for each memory cell of the set of memory cells, and the identified state of each memory cell determined based on the encoded data value combination.

As shown in FIG. 7, memory cell 1 has an encoded data value A of "1" stored in PDC0 and an encoded data value B of "0" stored in PDC1. With reference to the data structure in FIG. 5, the program manager determines that memory cell 1 is to be programmed to L7, based on the combined encoded data value of "10" (encoded data value A/encoded data value B). As shown in FIG. 6, memory cell 2 has an encoded data value A of "1" stored in PDC0 and an encoded data value B of "1" stored in PDC1. With reference to the data structure in FIG. 6, the program manager determines that memory cell 2 has passed programming (i.e., is programmed to one of L1 to L5) and is to be inhibited during the remainder of the cache program operation, based on the combined encoded data value of "11" (encoded data value A/encoded data value B).

As shown in FIG. 7, memory cell 3 has an encoded data value A of "0" stored in PDC0 and an encoded data value B of "0" stored in PDC1. With reference to the data structure in FIG. 7, the program manager determines that memory cell 3 is to be programmed to L6, based on the combined encoded data value of "00" (encoded data value A/encoded data value B). Lastly, in the example shown in FIG. 7, memory cell X has an encoded data value A of "0" stored in PDC0 and an encoded data value B of "1" stored in PDC1. With reference to the data structure in FIG. 7, the program manager determines that memory cell X is to be programmed to L7, based on the combined encoded data value of "10" (encoded data value A/encoded data value B). Advantageously, using the two data caches (PDC0 and PDC1) to store the encoded data values (as shown in the example table in FIG. 6), the additional data cache (PDC2) is freed up or made available to enable release of the cache for storing data corresponding with a next or subsequent cache program operation.

With reference to FIG. 5, during a time period between T2 and T3, execution of the cache program operation includes the L6 programming phase or loop to program the L6 memory cells and the L6 SSPC memory cells. In an embodiment, the memory cells to be programmed to the L6 program level and the L6 SSPC memory cells are identified by the program manager 134 using the encoded data values and encoding construct. For example, the program manager uses the encoded data values (e.g., the values shown in FIG. 7) to identify the memory cells having the combined encoded data value (e.g., the combination of encoded data value A and encoded data value B) that indicates the memory cells are to be programmed to the L6 level (e.g., a combined value of "00") and L6 SSPC levels (e.g., a combined value of "0").

As shown in FIG. 5, during the time period between T2 and T3, the cache program operation includes execution of a cache storage sub-operation is performed to move or store first data associated with a next or subsequent cache program operation (e.g., LP(N+1)) from the I/O data cache (SDC) to PDC2. Advantageously, PDC2 is available to store the first data (e.g., LP(N+1)) since the encoded data is stored in only PDC0 and PDC1, as described above. In an embodiment, the cache storage sub-operation includes the storing of second data (e.g., UP(N+1)) associated with the next cache program operation in the I/O cache. In an embodiment, the second data is sent by the host system in response to the cache ready signal generated by the second cache release sub-operation and the second data is stored in the I/O cache. In an embodiment, a time of the cache ready signal of the second cache release sub-operation enabling the storage of the second data associated with the next cache program operation (e.g., UP(N+1) data) is generated is approximately 75% of the total programming time (tProg). This represents an "early" release of the cache storage and corresponding early storing of the second data, as compared to a typical cache program operation.

In an embodiment, after L6 programming passes at time T3, the first data cache (PDC0) and the second data cache (PDC1) are free and available to store data associated with the next cache program operation (cache program operation N+1). In an embodiment, after L6 programming passes, a third cache release sub-operation of the cache program operation is executed. The third cache release sub-operation generates a cache ready signal to indicate to the host system that third data associated with the next cache program operation (e.g., XP(N+1) data) can be sent to and stored by the I/O data cache (SDC). In an embodiment, after L6 passes, the program manager can use the sense amplifier (SA) cache to identify memory cells to be programmed to L7. At this stage of the cache program operation, the memory cells are identified based on the SA cache data as either programmed to a respective target level (e.g., L1 to L6) or targeted for programming at the L7 level. For example, the SA cache may store a "1" to indicate a memory cell has been programmed and is to be inhibited and may store a "0" to indicate a memory cells is to be programmed to L7 during a next program loop of the current cache program operation. In an embodiment, the program manager may use the SA cache to calculate the updated inhibit data (i.e., data identifying memory cells that have passed programmed at a respective target programming level) and identify the memory cells to programmed to L7.

As shown in FIG. 5, in a time period between T3 and T4, the L7 program loop of the cache program operation is executed to program the memory cells that are identified to be programmed to the L7 program level. In an embodiment, during this time period, the first data (LP(N+1)) associated with the next cache program operation is moved from PDC2 to PDC1 and the second data (UP(N+1)) associated with the next cache program operation is moved from the I/O data cache (SDC) to the first data cache (PDC0). It is noted that, alternatively, during the L7 programming loop, the first data (LP(N+1)) can be stored in PDC0 and the second data (UP(N+1)) can be stored in PDC1. In an embodiment, in response to the third cache release sub-operation and corresponding cache ready signal, the host system sends the third data associated with the next cache program operation (e.g., XP(N+1) data) to the I/O data cache (SDC). In an embodiment, a time of the cache ready signal of the third cache release sub-operation enabling the storage of the third data associated with the next cache program operation (e.g., XP(N+1) data) is generated is approximately 88% of the total programming time (tProg). Like the second cache ready signal, the third cache ready signal represents an "early" release of the cache storage and corresponding early storing of the third data, as compared to a typical cache program operation.

FIG. 8 illustrates an example of the various states of the cache storage (i.e., PDC0, PDC1, and PDC2), the I/O data cache (SDC), and the sense amplifier (SA) cache at different times during the execution of the cache program operation with early cache release sub-operations, according to embodiments of the present disclosure. As described in detail above and shown in FIG. 8, after L4 passes, PDC0 stores data identifying memory cells of the UP of the memory array subject to the current cache program operation that have not yet been programmed and the memory cells of the UP that have been programmed to a target level (e.g., to levels L1 to L4) and are to be inhibited (i.e., denoted as "INH" cells). As described in detail above and shown in FIG. 8, after L4 passes, PDC1 stores data identifying memory cells of the XP of the memory array subject to the current cache program operation that have not yet been programmed and the memory cells of the XP that have been programmed to a target level (e.g., to levels L1 to L4) and are to be inhibited (i.e., denoted as "INH" cells).

As described in detail above and shown in FIG. 8, after L4 passes, PDC2 stores data identifying memory cells of the memory array subject to the current cache program operation that have not yet been programmed in accordance with SSPC processing (denoted in FIG. 8 as "SSPC" cells) and the memory cells that have been programmed in accordance with SSPC processing that are to be inhibited (i.e., denoted as "INH" cells). As described in detail above and shown in FIG. 8, after L4 passes, the I/O cache stores the first data associated with a next cache program operation (e.g., LP (N+1) data) and the SA cache stores data detected from the array of memory cells indicating whether the respective memory cells have passed programmed (denoted as "INH") or have not passed programming (denoted as "TARGET") identifying memory cells of the memory array subject to the current cache program operation that have not yet been programmed in accordance with SSPC processing (denoted in FIG. 8 as "SSPC" cells) and the memory cells that have been programmed in accordance with SSPC processing that are to be inhibited (i.e., denoted as "INH" cells).

As shown in FIG. 8, after L5 passes, PDC0 stores first encoded data (e.g., encoded data A) that is generated by the data encoding sub-operation of the cache program operation. At this time, PDC1 stores second encoded data (e.g., encoded data B) that is generated by the data encoding sub-operation of the cache program operation. Advantageously, as shown, since only PDC0 and PDC1 are used to store the encoded data values for the memory cells, PDC2 becomes free or available to store data relating to a next program operation. As a result, as shown in FIG. 8, during the L6 programming loop, the first data associated with the next cache program operation (LP (N+1) data) can be moved from the I/O cache to PDC2. In addition, the second data associated with the next cache program operation (UP (N+1) data) can be sent by the host system for storage in the I/O cache. Furthermore, during the L6 programming loop, the encoded data values stored in PDC0 and PDC1 are used to identify the L6 memory cells and the L6 SSPC memory cells.

As shown in FIG. 8, after L6 passes, PDC0 and PDC1 become available to store data (e.g., the encoded data values can be overwritten by other data). Accordingly, in an embodiment, during the L7 programming loop, the first data associated with the next cache program operation (LP (N+1) data) is stored in PDC1 and the second data associated with the next cache program operation (UP (N+1) data) is stored in PDC0. In addition, during the L7 programming loop, the third data associated with the next cache program operation (XP (N+1) data) is received from the host system and stored in I/O data cache. In an embodiment, after the L6 programming passes and during the L7 programming loop, the SA cache stores information identifying the memory cells that have passed programming (e.g., memory cells that have been programmed to L1 to L6) and are to be inhibited from further programming.

Data identifying memory cells of the UP of the memory array subject to the current cache program operation that have not yet been programmed and the memory cells of the UP that have been programmed to a target level (e.g., to levels L1 to L4) and are to be inhibited (i.e., denoted as "INH" cells). As described in detail above and shown in FIG. 8, after L4 passes, PDC1 stores data identifying memory cells of the XP of the memory array subject to the current cache program operation that have not yet been programmed and the memory cells of the XP that have been programmed to a target level (e.g., to levels L1 to L4) and are to be inhibited (i.e., denoted as "INH" cells).

As described in detail above and shown in FIG. 8, after L5 passes, PDC2 stores data identifying memory cells of the memory array subject to the current cache program operation that have not yet been programmed in accordance with SSPC processing (denoted in FIG. 8 as "SSPC" cells) and the memory cells that have been programmed in accordance with SSPC processing that are to be inhibited (i.e., denoted as "INH" cells). As described in detail above and shown in FIG. 8, after L4 passes, the I/O cache stores the first data associated with a next cache program operation (e.g., LP (N+1) data) and the SA cache stores data detected from the array of memory cells indicating whether the respective memory cells have passed programmed (denoted as "INH") or have not passed programming (denoted as "TARGET") identifying memory cells of the memory array subject to the current cache program operation that have not yet been programmed in accordance with SSPC processing (denoted in FIG. 8 as "SSPC" cells) and the memory cells that have been programmed in accordance with SSPC processing that are to be inhibited (i.e., denoted as "INH" cells).

Figure 9:
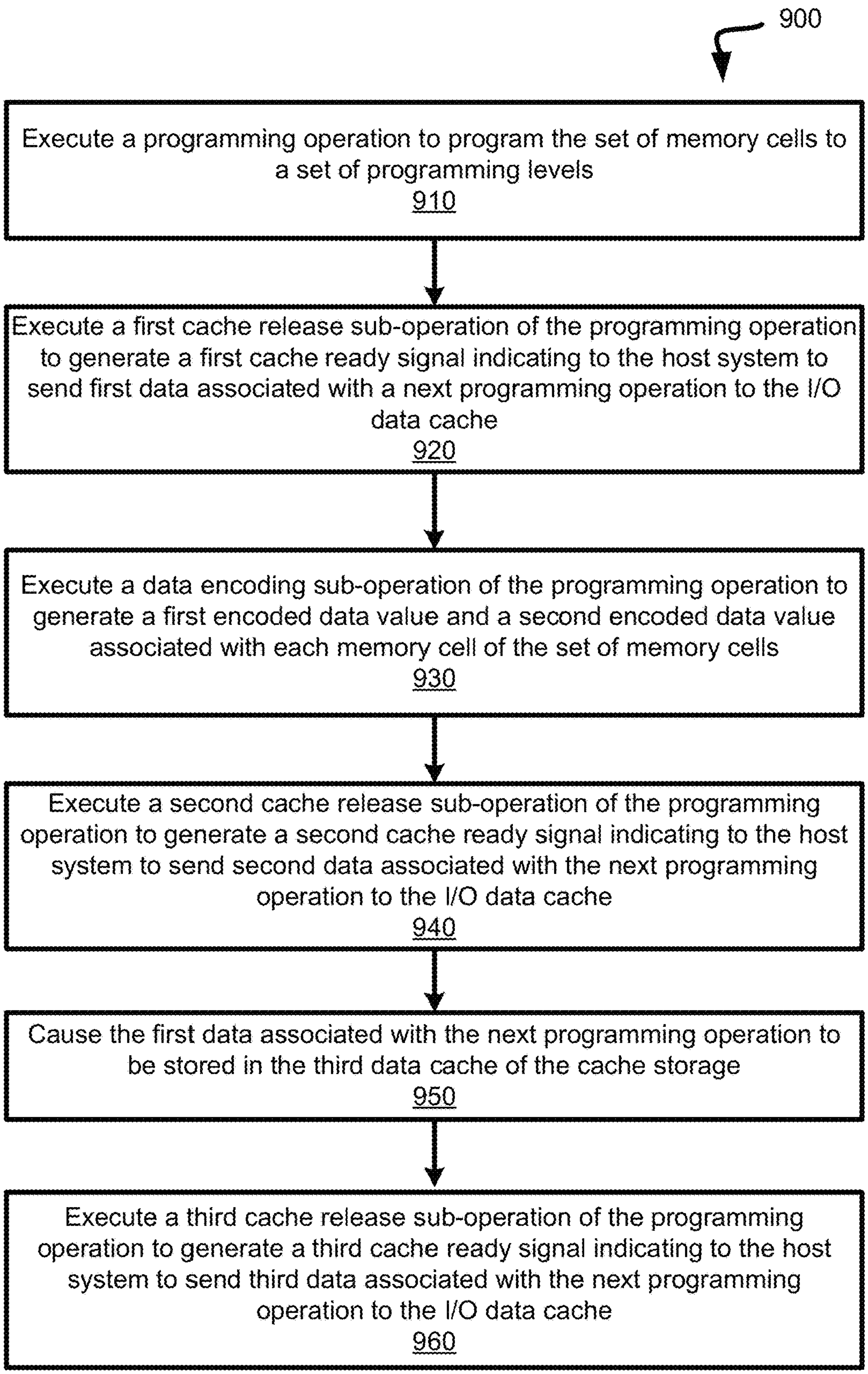
FIG. 9 is a flow diagram of an example method of a cache program operation with early cache release sub-operations to program a set of memory cells of a memory device, in accordance with one or more embodiments of the present disclosure.

FIG. 9 is a flow diagram of an example method 900 of a cache program operation to program a set of memory cells of a memory device in a memory sub-system in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the program manager 134 of FIG. 1A, FIG. 1B, and FIG. 4. According to embodiments, a memory device (e.g., memory device 130 of FIG. 1A) can store a set of instructions associated with method 900 (e.g., program manager 134 of FIG. 1A) that are executable by control logic (e.g., local media controller 135 of FIGS. 1A and 1B). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 910, an operation is executed. For example, processing logic (e.g., program manager 134) executes a programming operation to program the set of memory cells to a set of programming levels. In an embodiment, the programming operation (i.e., a cache program operation with a data encoding sub-operation and multiple cache release sub-operations) is executed with respect to a set of memory cells of a TLC memory device to program each memory cell to a respective target programming level of the set of programming levels (e.g., L1 to L7) using SSPC processing. In an embodiment, after initiating execution and during a first time period, the program operation performs programming sub-operations to program the memory cells in levels L1 to L4.

At operation 920, a first cache release sub-operation is executed. For example, the processing logic executes a first cache release sub-operation of the programming operation to generate a first cache ready signal indicating to the host system to send first data associated with a next programming operation to the I/O data cache. In an embodiment, at a first time (e.g., after L4 programming passes), the first cache release sub-operation of the current cache program operation is performed. The first cache release sub-operation generates a first cache ready signal to indicate to the host system that first data (e.g., LP(N+1)) associated with the next cache program operation (cache program operation N+1) can be sent to and stored by the I/O data cache (SDC). In an embodiment, after L4 passes, the program operation proceeds to the L5 programming stage to program memory cells to the L5 programming level.

At operation 930, a data encoding sub-operation is executed. For example, the processing logic executes a data encoding sub-operation of the programming operation to generate a first encoded data value and a second encoded data value associated with each memory cell of the set of memory cells. In an embodiment, the data encoding sub-operation is executed after L5 programming passes and generates a first encoded data value (i.e., encoded data value A) and a second encoded data value (i.e., encoded data value B) for each memory cell of the set of memory cells. The combined encoded data value (i.e., encoded data value A/encoded data value B) for each memory cell represents state information for the particular memory cell. For example, the state information can identify each memory cell as one of a memory cell to be programmed to the L6 program level, a memory cell to be programmed to the L6 program level using SSPC processing, a memory cell to be programmed to the L7 program level, or a memory cell that has already passed programming at a respective target level (e.g., L1 to L5) and is to be inhibited.

In an embodiment, the stored data corresponding to the L6 and L7 levels are encoded into the first data cache (e.g., PDC0 of FIG. 4) and the second data cache (e.g., PDC1 of FIG. 4), while freeing up or making available the third data cache (e.g., PDC2 of FIG. 4). The use of the encoded data stored in the two data caches (e.g., PDC0 and PDC1 of FIG. 4) enables the third data cache (e.g., PDC2 of FIG. 4) to be used to store data associated with a next cache program operation (also referred to as "cache program operation N+1). In an embodiment, the data encoding sub-operation generates encoded data values (i.e., encoded data values A and B) representing L6 memory cells, L6 SSPC memory cells, L7 memory cells, and inhibit cells (i.e., memory cells that have passed programming), while dropping L7 SSPC capability.

At operation 940, a second cache release sub-operation is executed. For example, the processing logic executes a second cache release sub-operation of the programming operation to generate a second cache ready signal indicating to the host system to indicate that second data associated with a next programming operation can be sent to the I/O data cache. In an embodiment, at a second time (e.g., after L5 programming passes), the second cache release sub-operation of the current cache program operation is performed. The second cache release sub-operation generates the second cache ready signal to indicate to the host system that the second data (e.g., UP (N+1)) associated with the next cache program operation (cache program operation N+1) can be sent to and stored by the I/O data cache. In an embodiment, after L5 passes, the program operation proceeds to the L6 programming stage to program L6 memory cells and L6 SSPC memory cells, which are identified based on the respective encoded data values stored in the first data cache (e.g., PDC0 of FIG. 4) and the second data cache (e.g., PDC1 of FIG. 4).

At operation 950, data is stored. For example, the processing logic causes the first data associated with the next programming operation to be stored in the third data cache of the cache storage. In an embodiment, during the L6 programming loop, the first data associated with the next cache program operation (LP (N+1) data) is moved from the I/O cache to the third data cache (e.g., PDC2 of FIG. 4). Advantageously, this frees up the I/O cache to enable storing of further data received from the host system, as described below.

At operation 960, a third cache release sub-operation is executed. For example, the processing logic executes a third cache release sub-operation of the programming operation to generate a third cache ready signal indicating to the host system to indicate that third data associated with a next programming operation can be sent to the I/O data cache. In an embodiment, at a third time (e.g., after L6 programming passes), the third cache release sub-operation of the current cache program operation is performed. The third cache release sub-operation generates the third cache ready signal to indicate to the host system that the third data (e.g., XP (N+1)) associated with the next cache program operation (cache program operation N+1) can be sent to and stored by the I/O data cache. In an embodiment, after L6 passes, the program operation proceeds to the L6 programming stage to program L6 memory cells and L6 SSPC memory cells, which are identified based on the respective encoded data values stored in the first data cache (e.g., PDC0 of FIG. 4) and the second data cache (e.g., PDC1 of FIG. 4).

In an embodiment, after the L6 programming passes, the first data cache (e.g., PDC0 of FIG. 4) and the second data cache (e.g., PDC1 of FIG. 4) are free and available to store data associated with the next cache program operation (cache program operation N+1). Accordingly, during the L7 programming phase of the current cache program operation (cache program operation N), the first data (LP(N+1)) associated with the next cache program operation is moved from the third data cache (e.g., PDC2 of FIG. 4) to the second data cache (e.g., PDC1 of FIG. 4) and the second data (UP(N+1)) associated with the next cache program operation is moved from the I/O data cache (e.g., SDC of FIG. 4) to the first data cache (e.g., PDC0 of FIG. 4). It is noted that, alternatively, during the L7 programming phase, the first data (LP(N+1)) can be stored in the first data cache (e.g., PDC0 of FIG. 4) and the second data (UP(N+1)) can be stored in the second data cache (e.g., PDC1 of FIG. 4).

In an embodiment, after L6 programming passes, the program manager calculates updated inhibit data (i.e., data identifying memory cells that have passed programmed at a respective target programming level). In an embodiment, upon reaching programming level L6, the data associated with the UP data (e.g., the data stored in the second data cache (e.g., PDC1 of FIG. 4)) is needed and maintained, while the LP data and the XP data is no longer needed.

In an embodiment, during the L7 program loop of the cache program operation, the L7 memory cells are programmed. In an embodiment, the memory cells to be programmed to L7 are identified by using the sense amplifier cache, where a memory cell with a first value in the sense amplifier cache (e.g., a "0") is identified as a L7 memory cell and a memory cell with a second value in the sense amplifier cache (e.g., a "1") is identified as a memory cell that has passed programming (e.g., a L1 to L6 memory cell) that is to be inhibited during the L7 program loop.

Figure 10:
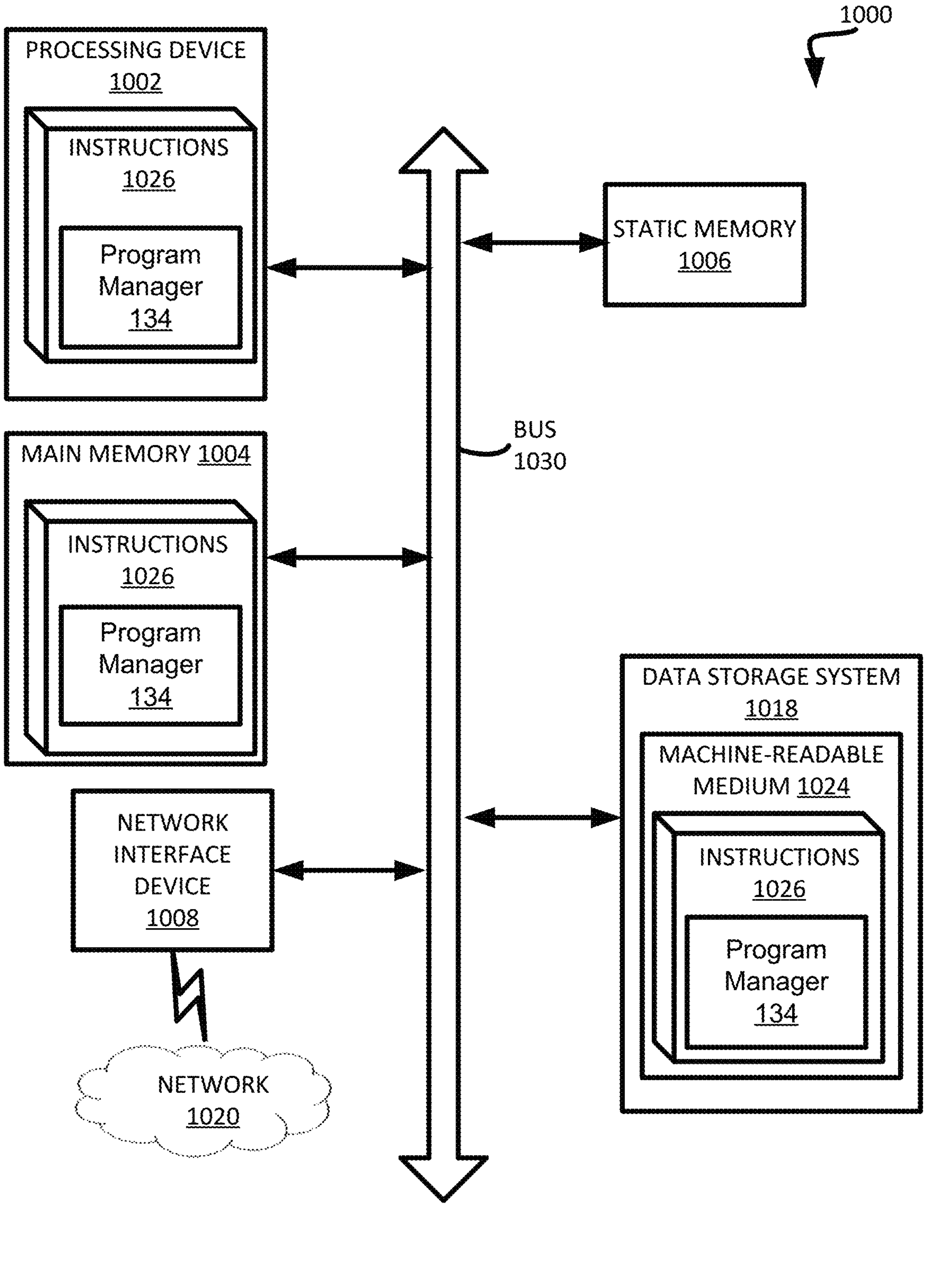
FIG. 10 is a block diagram of an example computer system in which embodiments of the present disclosure can operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the program manager 134 of FIGS. 1A and 1B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium, such as a non-transitory computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIGS. 1A and 1B.

In one embodiment, the instructions 1026 include instructions to implement functionality corresponding to the program manager 134 of FIGS. 1A and 1B). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:

a set of memory cells;

a cache storage operatively coupled to the set of memory cells, the cache storage comprising a first data cache, a second data cache, and a third data cache;

an input/output (I/O) data cache operatively coupled to the cache storage and a host system; and control logic, operatively coupled with the set of memory cells and the cache storage, to perform operations comprising:

executing a first programming operation to program the set of memory cells to a set of programming levels;

generating a first cache ready signal indicating to the host system to send first data associated with a second programming operation to the I/O data cache;

generating a first encoded data value and a second encoded data value associated with each memory cell of the set of memory cells;

generating a second cache ready signal indicating to the host system to send second data associated with the second programming operation to the I/O data cache;

causing the first data associated with the second programming operation to be stored in the third data cache of the cache storage; and generating a third cache ready signal indicating to the host system to send third data associated with the second programming operation to the I/O data cache.

2. The memory device of claim 1, the operations further comprising:

causing the first encoded data value to be stored in the first data cache; and causing the second encoded data value to be stored in the second data cache.

3. The memory device of claim 1, the operations further comprising determining, based on a combination of the first encoded data value and the second encoded data value associated with each memory cell of the set of memory cells, a state associated with each memory cell of the set of memory cells.

4. The memory device of claim 3, wherein the state associated with each memory cell of the set of memory cells comprises one of: a first memory cell to be programmed to a sixth programming level, a second memory cell to be programmed to the sixth programming level using selective slow program convergence (SSPC) processing, a third memory cell to be programmed to a seventh programming level, or a fourth memory cell that passed a program verify operation associated with the set of programming levels.

5. The memory device of claim 1, wherein the first cache ready signal is generated in response to determining at least a first portion of the set of memory cells passed a first program verify operation associated with a fourth programming level of the set of programming levels.

6. The memory device of claim 5, wherein the second cache ready signal is generated in response to determining at least a second portion of the set of memory cells passed a second program verify operation associated with a fifth programming level of the set of programming levels.

7. The memory device of claim 6, wherein the third cache ready signal is generated in response to determining at least a third portion of the set of memory cells passed a third program verify operation associated with a sixth programming level of the set of programming levels.

8. The memory device of claim 1, the operations further comprising:

identifying a first portion of the set of memory cells to be programmed to a sixth programming level based on a combination of the first encoded data value and the second encoded data value corresponding to each memory cell of the first portion of the set of memory cells; and causing the first portion of the set of memory cells to be programmed to the sixth programming level of the set of programming levels.

9. A memory device comprising:

a set of memory cells;

a cache storage operatively coupled to the set of memory cells, the cache storage comprising a first data cache, a second data cache, and a third data cache; and control logic, operatively coupled with the set of memory cells, to perform operations comprising:

initiating a first cache program operation to program the set of memory blocks of the set of memory planes to a set of programming levels;

generating a first encoded data value and a second encoded data value associated with each memory cell of the set of memory cells;

causing the first encoded data value associated with each memory cell of the set of memory cells to be stored in the first data cache;

causing the second encoded data value associated with each memory cell of the set of memory cells to be stored in the second data cache; and executing a programming loop to program a first portion of the set of memory cells to a sixth programming level of the set of programming levels, wherein the first portion of the set of memory cells is identified based on corresponding combinations of the first encoded data value and the second encoded data value.

10. The memory device of claim 9, the operations further comprising:

causing, at a first time during the first cache program operation, first data associated with a second cache program operation to be stored in an input/output (I/O) data cache of the memory device;

causing, at a second time during the first cache program operation, second data associated with the second cache program operation to be stored in the I/O data cache of the memory device; and causing, at a third time during the first cache program operation, third data associated with the second cache program operation to be stored in the I/O data cache of the memory device.

11. The memory device of claim 10, wherein the first data comprises lower page data associated with the second cache program operation, and wherein the second data comprises upper page data associated with the second cache program operation, and wherein the third data comprises extra page data associated with the second cache program operation.

12. The memory device of claim 10, the operation further comprising executing the second cache program operation using the first data, the second data, and the third data.

13. A method comprising:

executing a first programming operation to program a set of memory cells of a memory device to a set of programming levels, wherein the memory device comprises a first data cache, a second data cache, and a third data cache;

generating a first cache ready signal indicating to a host system to send first data associated with a second programming operation to an I/O data cache;

generating a first encoded data value and a second encoded data value associated with each memory cell of the set of memory cells;

generating a second cache ready signal indicating to the host system to send second data associated with the second programming operation to the I/O data cache;

causing the first data associated with the second programming operation to be stored in the third data cache; and generating a third cache ready signal indicating to the host system to send third data associated with the second programming operation to the I/O data cache.

14. The method of claim 13, further comprising:

causing the first encoded data value to be stored in the first data cache; and causing the second encoded data value to be stored in the second data cache.

15. The method of claim 13, further comprising determining, based on a combination of the first encoded data value and the second encoded data value associated with each memory cell of the set of memory cells, a state associated with each memory cell of the set of memory cells.

16. The method of claim 15, wherein the state associated with each memory cell of the set of memory cells comprises one of: a first memory cell to be programmed to a sixth programming level, a second memory cell to be programmed to the sixth programming level using selective slow program convergence (SSPC) processing, a third memory cell to be programmed to a seventh programming level, or a fourth memory cell that passed a program verify operation associated with the set of programming levels.

17. The method of claim 13, wherein the first cache ready signal is generated in response to determining at least a first portion of the set of memory cells passed a first program verify operation associated with a fourth programming level of the set of programming levels.

18. The method of claim 17, wherein the second cache ready signal is generated in response to determining at least a second portion of the set of memory cells passed a second program verify operation associated with a fifth programming level of the set of programming levels.

19. The method of claim 18, wherein the third cache ready signal is generated in response to determining at least a third portion of the set of memory cells passed a third program verify operation associated with a sixth programming level of the set of programming levels.

20. The method of claim 13, further comprising:

identifying a first portion of the set of memory cells to be programmed to a sixth programming level based on a combination of the first encoded data value and the second encoded data value corresponding to each memory cell of the first portion of the set of memory cells; and causing the first portion of the set of memory cells to be programmed to the sixth programming level of the set of programming levels.

* * * * *